US012062838B2

(12) United States Patent
McCorkle et al.

(10) Patent No.: US 12,062,838 B2
(45) Date of Patent: Aug. 13, 2024

(54) RF EMITTER CHARACTERIZATION SYSTEMS

(71) Applicant: Applied Signals Intelligence, Inc., Sterling, VA (US)

(72) Inventors: John W. McCorkle, Vienna, VA (US); Timothy R. Miller, Arlington, VA (US); Martin Rofheart, McLean, VA (US)

(73) Assignee: Applied Signals Intelligence, Inc., Sterling, VA (US)

(*) Notice: Subject to any disclaimer, the term of this patent is extended or adjusted under 35 U.S.C. 154(b) by 0 days.

(21) Appl. No.: 17/716,308

(22) Filed: Apr. 8, 2022

(65) Prior Publication Data

US 2022/0336945 A1 Oct. 20, 2022

Related U.S. Application Data

(60) Provisional application No. 63/172,949, filed on Apr. 9, 2021.

(51) Int. Cl.
*H01Q 1/28* (2006.01)
*H01Q 21/28* (2006.01)

(52) U.S. Cl.
CPC .................................. *H01Q 1/281* (2013.01)

(58) Field of Classification Search
CPC .......... H01Q 1/28; H01Q 1/281; H01Q 9/045; H01Q 21/28
See application file for complete search history.

(56) References Cited

U.S. PATENT DOCUMENTS

| | | | |
|---|---|---|---|
| 4,443,802 | A | 4/1984 | Mayes |
| 5,315,308 | A | 5/1994 | Nehorai et al. |
| 5,768,477 | A | 6/1998 | Johnson et al. |
| 6,067,053 | A | 5/2000 | Runyon |
| 6,329,955 | B1 | 12/2001 | McLean |
| 6,424,309 | B1 | 7/2002 | Johnston |
| 6,515,632 | B1 | 2/2003 | McLean |
| 6,963,301 | B2 | 11/2005 | Schantz |
| 7,388,550 | B2 | 6/2008 | McLean |
| 8,179,328 | B2 | 5/2012 | Brown |
| 8,253,626 | B2 | 8/2012 | Schantz |

(Continued)

FOREIGN PATENT DOCUMENTS

| | | | |
|---|---|---|---|
| CN | 106134002 A | * 11/2016 | ............ H01Q 21/26 |
| CN | 109428167 A | 3/2019 | |
| WO | 2000069198 | 11/2000 | |

OTHER PUBLICATIONS

Introduction into Theory of Direction Finding, 2011-2012 Rhode Schwarz catalog Radiomonitoring & Radiolocation.

(Continued)

*Primary Examiner* — Hoang V Nguyen
(74) *Attorney, Agent, or Firm* — DiBerardino McGovern IP Group LLC

(57) ABSTRACT

A multiport antenna in which the antenna conductive elements are arranged to form an at least partially enclosed volume which can accommodate an enclosure containing one or more electronic components, or optical components, or optoelectronic components, or a combination of these. The enclosure may also be provided with a conductive transparent window which permits optical components to receive and/or send optical information.

21 Claims, 14 Drawing Sheets

(56) References Cited

U.S. PATENT DOCUMENTS

| | | | | |
|---|---|---|---|---|
| 9,279,880 | B2 | 3/2016 | McCorkle | |
| 9,880,260 | B2 | 1/2018 | McCorkle | |
| 10,468,782 | B1 | 11/2019 | Steinbrecher | |
| 10,665,956 | B2 | 5/2020 | Li | |
| 10,794,984 | B2 | 10/2020 | Rappaport | |
| 10,873,137 | B2 | 12/2020 | Kossin | |
| 11,217,048 | B2 | 1/2022 | Stitt | |
| 11,539,123 | B2 | 12/2022 | Hu | |
| 2005/0243014 | A1* | 11/2005 | Bryan | H01Q 1/36 343/895 |
| 2007/0254587 | A1* | 11/2007 | Schadler | H01Q 21/24 455/562.1 |
| 2016/0018509 | A1 | 1/2016 | McCorkle | |
| 2016/0103199 | A1 | 4/2016 | Rappaport | |
| 2016/0146923 | A1 | 5/2016 | McCorkle | |
| 2018/0198194 | A1* | 7/2018 | Hyjazie | H01Q 11/08 |
| 2019/0214721 | A1 | 7/2019 | Hu et al. | |
| 2021/0098881 | A1 | 4/2021 | McCorkle | |
| 2024/0019519 | A1 | 1/2024 | McCorkle | |

OTHER PUBLICATIONS

Paul Denisowski, A comparison of radio direction-finding technologies, Rohde & Schwarz.

R&S ADDx Multichannel DF Antennas Product Overview, Version 4.00, Sep. 2013.

W. Read, Review of Conventional Tactical Radio Direction Finding Systems, Communications Electronic Warfare Section, Electronic Warfare Division, Defense Research Establishment Ottawa, Technical Note 89-12, May 1989.

Sathish Chandran, Editor, Advances in Direction-of-Arrival Estimation, Artech House 2006, Norwood Mass. ISBN-10: 1-59693-004-7.

Lan-Mei Wang, Gui-Bao Wang, Cao Zeng, "Mutual Coupling Calibration for Electro-Magnetic Vector Sensor." Progress In Electromagnetics Research B, vol. 52, pp. 347-362, 2013.

Oger M., Marie F., Lemur D., Le Bouter G., Erhel Y., Bertel L., "A method to calibrate HF receiving antenna arrays." IEE Ionospheric Radio Techniques Symposium, London: United Kingdom (2006).

Cecconi, B., and P. Zarka (2005), "Direction finding and antenna calibration through analytical inversion of radio measurements performed using a system of two or three electric dipole antennas on a three-axis stabilized spacecraft." Radio Sci., 40, RS3003, doi: 10.1029/2004RS003070.

Baum, C. E., "Some Characteristics of Electric and Magnetic Dipole Antennas for Radiating Transient Pulses." AFWL Sensors and Simulation Notes 125 (Jan. 1971).

J. S. Yu, C-L James Chen, and C. E. Baum, "Multipole Radiations: Formulation and Evaluation for Small EMP Simulators." Sensor and Simulation Notes 243 (Jul. 1978).

E. G. Farr and J. Hofstra, "An Incident Field Sensor for EMP Measurements." Electromagnetic Compatibility, IEEE Trans. on, May 1991, 105-13, Also published as Sensor and Simulation Notes 319 (Jul. 1989).

Baum C. E., "General properties of antennas." Electromagnetic Compatibility, IEEE Transactions on, vol. 44, No. 1, pp. 18-24, Feb. 2002 doi: 10.1109/15.990707. Also Sensor and Simulation Notes 330 (Jul. 1991).

F. M. Tesche, "The PxM Antenna and Applications to Radiated Field Testing of Electrical Systems, Part 1, Theory and Numerical Simulations." Sensor and Simulation Notes 407 (Jul. 1997).

F. M. Tesche, T. Karlsson, and S. Garmland, "The PxM Antenna and Applications to Radiated Field Testing of Electrical Systems, Part 2, Experimental Considerations." Sensor and Simulation Notes 409 (Jul. 1997).

E. G. Farr, C. E. Baum, W. D. Prather, and T. Tran, "A Two-Channel Balanced-Dipole Antenna (BDA) With Reversible Antenna Pattern Operating at 50 Ohms" Sensor and Simulation Notes 441 (Dec. 1999).

McLean, J., H. Foltz, and R. Sutton. "Conditions for Direction-Independent Distortion in UWB Antennas." Antennas and Propagation, IEEE Transactions on 54, No. 11 (Nov. 2006): 3178-83. doi:10.1109/TAP.2006.883956.

Mayes, P. E., W. Warren, and F. Wiesenmeyer. "The Monopole Slot: A Small Broad-Band Unidirectional Antenna." Antennas and Propagation, IEEE Transactions on 20, No. 4 (Jul. 1972): 489-93. doi: 10.1109/TAP. 1972.1140250.

McLean, J., and R. Sutton. "Practical Realization of PxM Antennas for High-Power, Broadband Applications." In Ultra- Wideband, Short-Pulse Electromagnetics 7, Chapter 30, edited by Frank Sabath, EricL. Mokole, Uwe Schenk, and Daniel Nitsch, 267-75. Springer New York, 2007.

Schroeder, K., and K. Soo Hoo. "Electrically Small Complementary Pair (ESCP) with Interelement Coupling." Antennas and Propagation, IEEE Transactions on 24, No. 4 (Jul. 1976): 411-18. doi: 10. 1109/TAP. 1976. 1141376.

A. Nehorai and E. Paldi, "Vector-sensor array processing for electromagnetic source localization," IEEE Transactions on Signal Processing, vol. 42, No. 2, pp. 376-398, Feb. 1994, doi: 10.1109/ 78.275610.

S. Cai, G. Wang, J. Zhang, K .- K. Wong, and H. Zhu, "Efficient direction of arrival estimation based on sparse covariance fitting criterion with modeling mismatch," Signal Processing, vol. 137, pp. 264-273, Aug. 2017, doi: 10.1016/j.sigpro.2017.02.011.

J. Duplouy, "Wideband Reconfigurable Vector Antenna for 3-D Direction Finding Application," Ph. D., Electromagnetism. Institut National Polytechnique de Toulouse, INP Toulouse, 2019.

K. Ghaemi, R. Ma, and N. Behdad, "A Small-Aperture, Ultrawideband HF/VHF Direction-Finding System For Unmanned Aerial Vehicles," IEEE Transactions on Antennas and Propagation, vol. 66, No. 10, pp. 5109-5120, Oct. 2018, doi: 10.1109/TAP.2018.2858210.

H. Krim and M. Viberg, "Two decades of array signal processing research: the parametric approach," IEEE Signal Processing Magazine, vol. 13, No. 4, pp. 67-94, Jul. 1996, doi: 10.1109/79.526899.

Y. L. Minghui Li and B. He, "Array Signal Processing for Maximum Likelihood Direction-of-Arrival Estimation," Journal of Electrical & Electronic Systems, vol. 3, No. 1, pp. 1-5, 2014, doi: 10.4172/2332-0796.1000117.

B. Ottersten, M. Viberg, and T. Kailath, "Analysis of subspace fitting and ML techniques for parameter estimation from sensor array data," IEEE Transactions on Signal Processing, vol. 40, No. 3, pp. 590-600, Mar. 1992, doi: 10.1109/78.120802.

Paul Denisowski, "An Introduction to Radio Direction Finding Methodologies," [Online]. Available: https://www.rohde- schwarz. com/US/knowledge-center/videos/webinar-an-introduction-to-direction-finding-video- detailpage_251220-761216.html.

E. J. Riley, "Planar Antenna Arrays for Correlation Direction Finding Systems for use on Mobile Platforms," Nov. 2012, Accessed: Dec. 17, 2019. [Online]. Available: https://etda.libraries.psu. edu/ catalog/16222.

Wei Jiang and A. M. Haimovich, "Cramer-Rao bound and approximate maximum likelihood estimation for non-coherent direction of arrival problem," in 2016 Annual Conference on Information Science and Systems (CISS), Mar. 2016, pp. 506-510, doi: 10.1109/ CISS.2016.7460554.

F .- G. Yan, J. Wang, S. Liu, B. Cao, and M. Jin, "Computationally efficient direction of arrival estimation with unknown No. of signals," Digital Signal Processing, vol. 78, pp. 175-184, Jul. 2018, doi: 10.1016/j.dsp.2018.03.012.

X. Zhang, M. N. E. Korso, and M. Pesavento, "Maximum Likelihood and Maximum A Posteriori Direction-of-Arrival Estimation in the Presence of SIRP Noise," arXiv: 1603.08982 [cs, math, stat], Mar. 2016, Accessed: Jun. 12, 2019. [Online]. Available: http:// arxiv.org/abs/1603.08982.

* cited by examiner

RF EMITTER CHARACTERIZATION SYSTEMS

CROSS-REFERENCE TO RELATED APPLICATIONS

This application is related to and claims the benefit of U.S. Provisional Application No. 63/172,949, filed Apr. 9, 2021, the contents of which are hereby incorporated into this application in their entirety. This application is related to U.S. patent application Ser. No. 17/038,600, filed Sep. 30, 2020, the contents of which are hereby incorporated into this application in their entirety. This application is also related to U.S. Pat. No. 9,279,880, issued Mar. 16, 2016, the contents of which are hereby incorporated into this application in their entirety.

FIELD

The disclosed subject matter relates to antenna systems, that is, antennas and associated electronics, for characterization of radio frequency (RF) systems, such as radar, communications, direction finding (DF), multi-input multi-output (MIMO) radar and communication systems, RF metrology, and other applications where antenna systems are used, and in particular to such RF emitter characterization systems requiring antenna systems with multiple ports and as may be used in implementations in which space is limited, such as in payload sections of unmanned aerial systems.

BACKGROUND

Multiport antenna systems are useful in a wide range of applications, including direction finding, radar, and any system using MIMO techniques. One platform of particular interest for such systems is unmanned aerial systems. For such platforms, however, there are significant constraints in terms of the size and weight of the payloads they can carry. It is therefore advantageous to develop antenna systems that (1) occupies as little space as possible, (2) allows re-use or concurrent use of much of the space to house electronic circuitry needed by the system, (3) covers wide bandwidths including low frequencies with wavelengths many times larger than the platform carrying the antenna, and (4) provides highly independent information from its ports in order to support high MIMO processing gain, high accuracy angle of arrival (AoA) estimation from any polarization and any angle, and sensitivity to any polarization wavefront from any angle, or in other words, no null to a wave with a certain polarization or coming from a certain direction.

A key problem of current RF emitter characterization systems is their large size, weight, power consumption, and setup time, when they must operate at low frequencies, such as a less than a few MHz.

Another problem for RF emitter characterization systems is the time required to compute the AoA for numerous signals of interest, such as the AoA of each packet from a large number of frequency hopping emitters. In this document the term "AoA" is used to mean either a single angle, such as azimuth, or a combination of angles, such as azimuth and elevation, in a defined coordinate system.

Given the extraordinarily wide frequency range and the associated wide range of patterns produced by the antenna across that frequency range, and given how the patterns can be significantly modified by different installations, which must all be comprehended by the RF emitter characterization system's estimator system, it will be appreciated that there exists a "array manifold" definition that can capture the wide range of patterns, and be used to clearly explain embodiments of an RF emitter characterization system (a) that embrace the dramatic pattern differences across the extraordinarily wide frequency range and span of installations, (b) that has processing gain to address the desire for a system that operates with enough sensitivity to enable characterization of small signals being listened to with nearby standard radio systems with larger antennas, and (c) that is able to estimate not only a signal's AoA, magnitude, and polarization, but also the AoA, magnitude, and polarization of a number of multipath terms associated with that signal. It should be understood that an array manifold can represent an isolated array, or an "as installed" array.

An array manifold is an antenna array's transfer function versus AoA and polarization, including a transfer function for each of its Np ports. An array manifold can be expressed as a five dimensional (5D) function or matrix that captures the complex output voltage (e.g. mag/phase phasor notation for a sine wave, $\cos(2\pi ft)$ where $t=0$ is at a specified physical center point of the array), from the antenna's list of ports, when the antenna receives a standardized 1 V/m field strength electromagnetic (EM) wave arriving from a given angle and with a given polarization, and the antenna's ports are terminated with a specified load resistance RL. When expressed as a function, such as M(port, frequency, Az, El, polarization) (5 dimensions for the 5 arguments) the output is the complex output voltage from the given port resulting from an incoming signal with the given frequency, AoA, and polarization. When expressed as a matrix, the matrix as a whole captures the complex output voltages for (a) the array's list of ports, (b) a list of frequencies, a list of AoA (i.e., combinations of (c) azimuth and (d) elevation angles), and (e) two orthogonal polarizations (e.g., horizontal and vertical, or left and right hand circular, etc.). In this matrix case, the manifold might be expressed as the 5D matrix $M_{i,f,k,n,pol}$ where the indexes i, f, k, n, pol (5 dimensions) correspond to (i) the port, (f) the frequency, (k) the azimuth, (n) the elevation, and (pol) the polarization. Interpolation between points in the matrix can be used to turn the matrix representation into a smooth functional representation.

It is often convenient to express the set of complex voltages from the set of antenna ports as a vector, at a given frequency, AoA (azimuth and elevation combo), and polarization. For example, a vector, $\bar{v}$ (where the over-bar indicates the variable is a vector) could be defined where its terms are, $$v_i = M_{i,f,k,n,0} \tag{1}$$

where the pol=0 indicates the vector is for vertical polarization, and where, for brevity, the f, k, n indexes are "understood" to ultimately take on particular values associated with the context of the vector's use.

Similarly, the vector is sometimes made explicitly a function of the AoA, as in $\bar{v}(\theta_k,\phi_n)$, where its elements are, $$v_i(\theta_k,\phi_n) = M_{i,f,k,n,0} \tag{2}$$

where, for brevity, the frequency is not explicitly shown but "understood" to take on a particular value associated with the context of the vector's use.

The following are incorporated by reference in their entirety.

Reference 1: Introduction into Theory of Direction Finding, 2011-2012 Rhode Schwarz catalog Radiomonitoring & Radiolocation.

Reference 2: Paul Denisowski, A comparison of radio direction-finding technologies, Rohde & Schwarz.

Reference 3: R&S ADDx Multichannel DF Antennas Product Overview, Version 4.00, September 2013.

Reference 4: W. Read, Review of Conventional Tactical Radio Direction Finding Systems, Communications Electronic Warfare Section, Electronic Warfare Division, Defense Research Establishment Ottawa, Technical Note 89-12, May 1989.

Reference 5: Sathish Chandran, Editor, Advances in Direction-of-Arrival Estimation, Artech House 2006, Norwood Mass. ISBN-10: 1-59693-004-7.

Reference 6. Lan-Mei Wang, Gui-Bao Wang, Cao Zeng, "MUTUAL COUPLING CALIBRATION FOR ELECTRO-MAGNETIC VECTOR SENSOR." Progress In Electromagnetics Research B, Vol. 52, pp 347-362, 2013.

Reference 7: Oger M., Marie F., Lemur D., Le Bouter G., Erhel Y., Bertel L., "A method to calibrate HF receiving antenna arrays." IEE Ionospheric Radio Techniques Symposium, London: United Kingdom (2006).

Reference 8: Cecconi, B., and P. Zarka (2005), "Direction finding and antenna calibration through analytical inversion of radio measurements performed using a system of two or three electric dipole antennas on a three-axis stabilized spacecraft." Radio Sci., 40, RS3003, doi: 10.1029/2004RS003070.

Reference 9: Baum, C. E., "Some Characteristics of Electric and Magnetic Dipole Antennas for Radiating Transient Pulses." AFWL Sensors and Simulation Notes 125 (January 1971).

Reference 10: J. S. Yu, C-L James Chen, and C. E. Baum, "Multipole Radiations: Formulation and Evaluation for Small EMP Simulators." Sensor and Simulation Notes 243 (July 1978).

Reference 11: E. G. Farr and J. Hofstra, "An Incident Field Sensor for EMP Measurements." Electromagnetic Compatibility, IEEE Trans. on, May 1991, 105-13, Also published as Sensor and Simulation Notes 319 (July 1989).

Reference 12: Baum C. E., "General properties of antennas." Electromagnetic Compatibility, IEEE Transactions on, vol. 44, no. 1, pp. 18-24, February 2002 doi: 10.1109/15.990707. Also Sensor and Simulation Notes 330 (July 1991);

Reference 13: F. M. Tesche, "The PxM Antenna and Applications to Radiated Field Testing of Electrical Systems, Part 1, Theory and Numerical Simulations." Sensor and Simulation Notes 407 (July 1997).

Reference 14: F. M. Tesche, T. Karlsson, and S. Garmland, "The PxM Antenna and Applications to Radiated Field Testing of Electrical Systems, Part 2, Experimental Considerations." Sensor and Simulation Notes 409 (July 1997).

Reference 15: E. G. Farr, C. E. Baum, W. D. Prather, and T. Tran, "A Two-Channel Balanced-Dipole Antenna (BDA) With Reversible Antenna Pattern Operating at 50 Ohms" Sensor and Simulation Notes 441 (December 1999).

Reference 16: McLean, J., H. Foltz, and R. Sutton. "Conditions for Direction-Independent Distortion in UWB Antennas." Antennas and Propagation, IEEE Transactions on 54, no. 11 (November 2006): 3178-83. doi:10.1109/TAP.2006.883956.

Reference 17: Mayes, P. E., W. Warren, and F. Wiesenmeyer. "The Monopole Slot: A Small Broad-Band Unidirectional Antenna." Antennas and Propagation, IEEE Transactions on 20, no. 4 (July 1972): 489-93. doi:10.1109/TAP.1972.1140250.

Reference 18. McLean, J., and R. Sutton. "Practical Realization of PxM Antennas for High-Power, Broadband Applications." In Ultra-Wideband, Short-Pulse Electromagnetics 7, Chapter 30, edited by Frank Sabath, EricL. Mokole, Uwe Schenk, and Daniel Nitsch, 267-75. Springer New York, 2007.

Reference 19: McLean, J. S., and G. E. Crook. Broadband Antenna Incorporating Both Electric and Magnetic Dipole Radiators, U.S. Pat. No. 6,329,955.

Reference 20. McLean, J. S. PxM Antenna with Improved Radiation Characteristics over a Broad Frequency Range. U.S. Pat. No. 7,388,550 Jun. 17, 2008.

Reference 21: G. F. Brown, Direction finding antenna U.S. Pat. No. 8,179,328, 15 May 2012.

Reference 22: Schroeder, K., and K. Soo Hoo. "Electrically Small Complementary Pair (ESCP) with Interelement Coupling." Antennas and Propagation, IEEE Transactions on 24, no. 4 (July 1976): 411-18. doi:10.1109/TAP.1976.1141376.

Reference 23: Mayes, P. E. Stripline Fed Hybrid Slot Antenna, U.S. Pat. No. 4,443,802 April 1984.

Reference 24: A. Nehorai and E. Paldi, "Vector-sensor array processing for electromagnetic source localization," *IEEE Transactions on Signal Processing*, vol. 42, no. 2, pp. 376-398, February 1994, doi: 10.1109/78.275610.

Reference 25: A. Nehorai and E. Paldi, "U.S. Pat. No. 5,315,308—Method for electromagnetic source localization," 5315308, May 24, 1994.

Reference 26: S. Cai, G. Wang, J. Zhang, K.-K. Wong, and H. Zhu, "Efficient direction of arrival estimation based on sparse covariance fitting criterion with modeling mismatch," *Signal Processing*, vol. 137, pp. 264-273, August 2017, doi: 10.1016/j.sigpro.2017.02.011.

Reference 27: J. Duplouy, "Wideband Reconfigurable Vector Antenna for 3-D Direction Finding Application," Ph.D., Electromagnetism. Institut National Polytechnique de Toulouse, INP Toulouse, 2019.

Reference 28: K. Ghaemi, R. Ma, and N. Behdad, "A Small-Aperture, Ultrawideband HF/VHF Direction-Finding System For Unmanned Aerial Vehicles," *IEEE Transactions on Antennas and Propagation*, vol. 66, no. 10, pp. 5109-5120, October 2018, doi: 10.1109/TAP.2018.2858210.

Reference 29: H. Krim and M. Viberg, "Two decades of array signal processing research: the parametric approach," *IEEE Signal Processing Magazine*, vol. 13, no. 4, pp. 67-94, July 1996, doi: 10.1109/79.526899.

Reference 30: Y. L. Minghui Li and B. He, "Array Signal Processing for Maximum Likelihood Direction-of-Arrival Estimation," *Journal of Electrical & Electronic Systems*, vol. 3, no. 1, pp. 1-5, 2014, doi: 10.4172/2332-0796.1000117.

Reference 31: B. Ottersten, M. Viberg, and T. Kailath, "Analysis of subspace fitting and ML techniques for parameter estimation from sensor array data," *IEEE Transactions on Signal Processing*, vol. 40, no. 3, pp. 590-600, March 1992, doi: 10.1109/78.120802.

Reference 32: Paul Denisowski, "An Introduction to Radio Direction Finding Methodologies," [Online]. Available: https://wireless.vt.edu/symposiumarchives/2015_slides/document.pdf.

Reference 33: E. J. Riley, "Planar Antenna Arrays for Correlation Direction Finding Systems for use on Mobile Platforms," November 2012, Accessed: Dec. 17, 2019. [Online]. Available: https://etda.libraries.psu.edu/catalog/16222.

Reference 34: Wei Jiang and A. M. Haimovich, "Cramer-Rao bound and approximate maximum likelihood estimation for non-coherent direction of arrival problem," in 2016 *Annual Conference on Information Science and Systems* (*CISS*), March 2016, pp. 506-510, doi: 10.1109/CISS.2016.7460554.

Reference 35: F.-G. Yan, J. Wang, S. Liu, B. Cao, and M. Jin, "Computationally efficient direction of arrival estimation with unknown number of signals," *Digital Signal Processing*, vol. 78, pp. 175-184, July 2018, doi: 10.1016/j.dsp.2018.03.012.

Reference 36: X. Zhang, M. N. E. Korso, and M. Pesavento, "Maximum Likelihood and Maximum A Posteriori Direction-of-Arrival Estimation in the Presence of SIRP Noise," *arXiv:*1603.08982 [*cs, math, stat*], March 2016, Accessed: Jun. 12, 2019. [Online]. Available: http://arxiv.org/abs/1603.08982.

It would therefore be desirable to have a small multi-port antenna that provides the advantages described above. It would also be desirable to use such an antenna to provide for rapid and accurate characterization of RF signals, such as from radar and communication systems, including those using MIMO, frequency hopping, digitally coded, and other modulations, and where characterization includes such things as the range to the emitter, the angle of arrival of the signal, the signal's bandwidth, power, phase, modulation characteristics including joint time frequency characteristics, and etc. It is this context that the need for the subject matter disclosed herein arises.

SUMMARY

The following presents a concise summary of one or more embodiments in order to provide a basic understanding of the embodiments. This summary is not an extensive overview of all contemplated embodiments and is not intended to identify key or critical elements of all embodiments nor delineate the scope of any or all embodiments. Its sole purpose is to present some concepts of one or more embodiments in a simplified form as a prelude to the more detailed description that is presented later.

According to an aspect of an embodiment, there is disclosed an arrangement for a multiport antenna in which the antenna's conductive elements are arranged to define an at least partially enclosed interior volume. The interior volume is shaped and sized to accommodate a conductive enclosure containing electronic circuitry. The conductive enclosure and the antenna's conductive elements may also accommodate optical elements and optoelectronic circuitry. One or more window, which may be lenses, of optically transparent material may be placed in the antenna's conductive elements and a wall of the conductive enclosure to permit receipt and transmission of optical radiation. Preferably, the optically transparent material is electrically conductive. In this manner the combination the antenna and the conductive enclosure with its contents can be installed in spaces subject to size and volume constraints, such as the instrumentation payload section of an unmanned aerial system, without sacrificing functionality.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the methods and systems of embodiments of the invention by way of example, and not by way of limitation. Together with the detailed description, the drawings further serve to explain the principles of and to enable a person skilled in the relevant art(s) to make and use the methods and systems presented herein. In the drawings, like reference numbers indicate identical or functionally similar elements.

DETAILED DESCRIPTION

This specification discloses one or more embodiments that incorporate the features of this invention. The disclosed embodiment(s) merely exemplify the present invention. The scope of the present invention is not limited to the disclosed embodiment(s). The present invention is defined by the claims appended hereto.

The embodiment(s) described, and references in the specification to "one embodiment," "an embodiment," "an example embodiment," "an exemplary embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1:
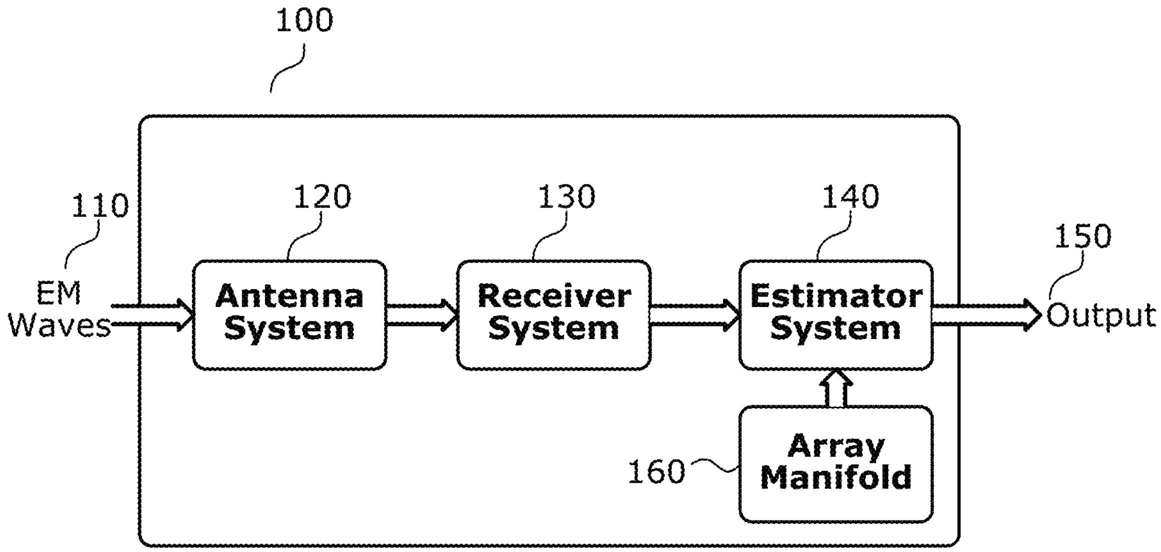
FIG. 1 is a functional block diagram for an embodiment of an RF emitter characterization system, containing an antenna system, a receiver system, and an estimator system according to an aspect of an embodiment.
Figure 2:
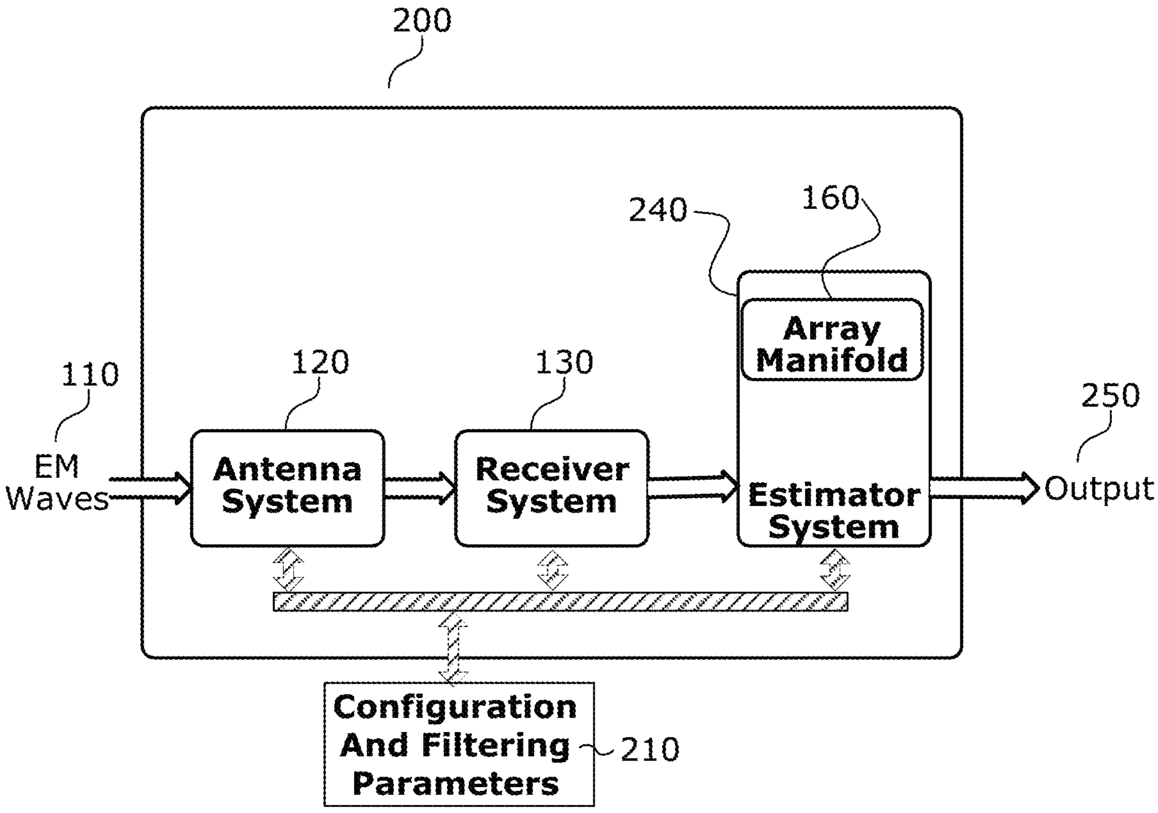
FIG. 2 is a functional block diagram of an RF emitter characterization system embodiment similar to the embodiment disclosed in connection with FIG. 1 but additionally including configuration and filtering parameters.

The disclosed subject matter relates RF characterization systems including multi-port antennas. Such an RF characterization system 100 is shown in FIG. 1. As depicted, the RF characterization system 100 includes an antenna system 120, a receiver system 130, and an estimator system 140. The estimator system 140 has access to an array manifold 160. It will be appreciated that these demarcations of elements is conceptual rather than physical, and these elements may be combined. For example, the estimator system 140 may have access to the array manifold 160 by virtue of the array manifold being part of the estimator system 140 as shown in FIG. 2.

FIG. 1 shows the signal flow through an RF emitter characterization system 500 according to an aspect of an embodiment. Electromagnetic (EM) waves 110 from various emitters arrive and are received by an antenna system 120. Antenna system 120 has characteristics captured in the array manifold 160 and, consistently with this manifold, converts the incoming EM wave 110 into a set of complex voltages, the set corresponding to the outputs of the ports in the antenna system 120. The receiver system 130 has a set of receive channels allowing it to accept the set of port voltages. The set of receive channels isolates and digitizes signals of potential interest (SoPI) and outputs a corresponding set of digitized SoPI. The set of digitized SoPI is accepted by the estimator system 140. The estimator system 140 has access to the array manifold 160 characterizing antenna system 120, and may also have knowledge of a set of phase and magnitude shifts that occur in the set of paths between the set of ports in antenna system 120 and the set of channels in receiver system 130, and uses this knowledge, along with the set of digitized SoPI, to estimate the AoA, and potentially other signal parameters, which estimate(s) it passes to output 150.

In terms of the isolation and characterization of an SoPI, or simply SoI, there may be two or more "parameter" lists. A first parameter list may be "SoI isolation parameters" comprising a list of criteria to isolate an SoI from other signals and noise. A second parameter list may be "signal parameters", which are the parameters measured for SoI's from a given emission, or set of emissions, from an emitter, such as its center frequency, polarization, magnitude, bandwidth, AoA, range, SNR, modulation type, modulation parameters, time stamp, etc.

The SoI isolation parameters may specify that an SoI be within a center frequency range, bandwidth range, time duration range, etc., or have a hop-frequency set of parameters (such as hop duration range, rep-rate range, single-packet bandwidth range, total bandwidth range, packet start, stop and/or center frequency range, modulation characteristic such as chirp within a ramp-rate range, or $N_Q$-QAM within an $N_Q$ range, or $N_{psk}$-PSK within an $N_{psk}$ range, etc.), or that the SoI comes from a certain AoA range, or that one or more of those parameters have a variance, after a number of looks, that falls within a certain range. The SoI isolation parameters can be broken into different levels where each level is applied at different stages of processing.

At the highest level, there may be a receiver tuned to a band to cover all SoI's in that band, e.g., the entire 2-32 MHz high-frequency (HF) band. This may be regarded as an initial limitation or "parameter" on defining an SoI space—the lowest and highest frequency of interest (where to tune the radio and what bandwidth filter to use). These might be considered "pre-banding" or "pre-JTFA" parameters, with JTFA being an acronym for joint time frequency analysis.

Given whatever receiver bandwidth (e.g., 40 MHz), it is then possible to look more narrowly (more precisely on SoI) such as a 3 kHz bandwidth (BW) single sideband (SSB) signal at HF, versus a 25 kHz BW narrow band FM (NBFM) signal at V/UHF, versus a 200 kHz BW commercial FM signal, versus a 6 MHz BW TV signal, or versus a 10 MHz bandwidth radar signal at 3 GHz, etc. SoI isolation parameters such as these bandwidths of interest can be used to "aim" or precondition the JTFA processing to reduce processing load, in which case, they may be regarded as "pre-JTFA" parameters as well.

According to an aspect of an embodiment, JTFA may be used for this bandwidth refinement. JTFA detects time periods and frequency ranges where signals are located (or "pop up" or have high magnitude) in time and frequency. It is effectively equivalent to a parallel bank of filters of various bandwidths, wider bandwidth filters having finer time resolution, where the filter outputs allow an analysis that can trade time resolution for frequency resolution to optimize detection, or measurement of start and stop times, or measurement of the SoI's power spectral density or modulation characteristics, etc.

An initial SoI (i.e., post-JTFA) is declared (detected) when a higher magnitude time span and bandwidth JTF zone is found on one or more of the plurality of ports. In this case, an SoI data record, containing, for at least two of the plurality of ports, a finite length record covering the particular time span and frequency span detected, is made for that SoI. Generation of this record constitutes initial SoI "detection". The individual records associated with each of the plurality of ports, is then cross-correlated—each port with at least one among all the ports.

According to an aspect of an embodiment, this use of JTFA detection and choosing of the length of the data record (in time or frequency) is performed using a constant false alarm rate (CFAR) detector, where the false alarm rate can be specified in the "SoI isolation parameters". Other detectors could also be selected via the "SoI isolation parameters".

Under control of the parameters, all the SoI's detected at this point can be output or they can be pruned and considered "preliminary". That is, only those SoI's passing additional "post JTFA" or "pre-characterization" parameters' criteria are eligible for final output. An SoI record may be time-stamped with absolute time (e.g., GPS time) or a number associated with timing, so that the "post-JTFA", "pre-characterization", and post-characterization SoI isolation parameters can include time metrics, durations, periodicity, etc. along with any measured "signal parameters". "Pre-characterization" SoI's (i.e., those passing the criteria provided in the "SoI isolation parameters") are sent on either to the output or for further processing, according to the "SoI isolation parameters".

Generally, the number of SoPI's is reduced at each stage of processing. SoPI's are typically pruned when they do not sufficiently match the "parameter ranges" associated with being passed on from a given processing stage. For example, only after JTFA processing can SoPI's be assessed as passing JTFA metrics like center frequency, bandwidth, time durations, and absolute time of occurrence, etc.

Using direction finding (AoA estimation) as an example of characterization, "Post DF" or "pre-clustering" parameters would add, for example, that an SoI must be within a range of AoA's, or have certain polarization or magnitude properties, or have certain multipath properties. Note that estimating an SoI's AoA also involves estimating its polarization and magnitude and can also include estimating the AoA, polarization, and magnitude of its associated multipath terms. All can be part of the characterization process. The AoA estimator system is configured to provide the measurements required by the SoI isolation parameters. For example, it might be configured to assume a known polarization signal or to estimate an unknown polarization signal, or to include or not include a number of multipath terms. SoI's passing the criteria as described by the "post-DF parameters" are sent on to output or for further processing, according to the "SoI isolation parameters".

If the "SoI isolation parameters" include "post clustering" or "multi-look" parameters (i.e., the process is not finished after DF processing) then after DF processing, it is possible to output preliminary, not "final" but "next level" "pre-clustering", SoI's. In this case, the system does not reduce to and output the "final" SoI's until after the "multi-look" or "clustering" step.

The "post clustering" "multi-look" parameters include things such as, for example, that a set of hops from the emitter of a batch of SoI's are all within 10 degrees of one another, or that the SoI's from an emitter have a variance in AoA or magnitude below a certain threshold (potentially after outlier removal), or have a polarization that (a) remains within a certain variance (such as from a stationary antenna), or (b) goes beyond a certain variance (such as from a mobile radio's whip antenna moving around), or (c) is within an absolute range (e.g., 10 degrees from vertical), etc.

Any measured "signal parameter" for an SoI at any stage can be output (i.e., under the control of the criteria in the SoI isolation parameters). Again, as opposed to SoI isolation parameters, "signal parameters" are the parameters measured for SoI's from a given emission, or set of emissions, from an emitter, like its center frequency, polarization, magnitude, bandwidth, AoA, range, location, modulation type, modulation parameters, time stamp, etc.

As indicated elsewhere, the lines of demarcation of the system are arbitrary and for explanation purposes only. For example, a single physical component may carry out multiple functions. For example, the functions could be performed by one or more suitably programmed microprocessors.

FIG. 2 is a functional block diagram for an embodiment of an RF characterization system 200 similar to that shown in FIG. 1, but in which provision is made for each block to accept or communicate parameters 210. The blocks can communicate configuration and filtering parameters between themselves, or from an attached system, or both, allowing quick and easy customization, adaptability, and regression testing.

FIG. 2 shows the signal flow through RF characterization system 200. Electromagnetic (EM) waves 110 from various emitters arrive and are received by an antenna system 120. The antenna system 120 has characteristics captured in an array manifold 160 and, consistently with this manifold, converts the incoming EM wave 110 into a set of complex voltages, the set corresponding to the outputs of the ports in the antenna system 120. A receiver system 130 has a set of receive channels allowing it to accept the set of port voltages. The set of receive channels isolates and digitizes signals of potential interest (SoPI) and outputs a corresponding set of digitized SoPI. The set of digitized SoPI are accepted by an estimator system 240. The estimator system 240 has knowledge of the manifold characterizing the antenna system 120, and may also have knowledge of a set of phase and magnitude shifts that occur in the set of paths between the set of ports in the antenna system 120 and the set of channels in the receiver system 130, and uses this knowledge, along with the set of digitized SoPI, to estimate the AoA, and potentially other signal parameters, which estimate(s) it passes to output 250. Configuration and filtering parameters 210 can be used by at least one of: the antenna system 120, receiver system 130, and estimator system 240. The configuration and filtering parameters 210 may be communicated between 120, 130, and 240, or from an attached system, or both, allowing quick and easy customization, adaptability, and regression testing.

The RF characterization system 200 may be configured to identify a target based on at least one of the RF signatures of at least one of the uplink radio signals, the downlink radio signals, a direction to the target, and a location of the target. The RF characterization system 200 may further comprise a database of RF signature data that, for example, a processor accesses to identify the target. The RF signature data may comprise modulation information, and the database may comprise a modulation look-up table.

Figure 3:
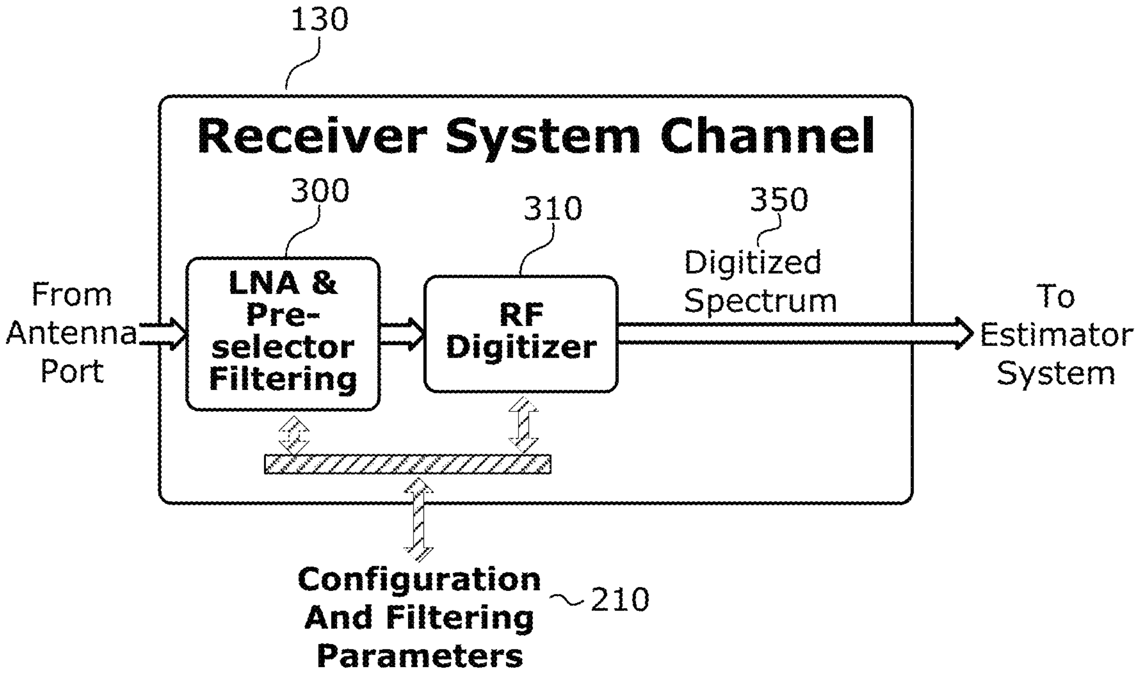
FIG. 3 is a functional block diagram illustrating an example arrangement for one of the channels in the multichannel receiver system of FIG. 2 according to an aspect of an embodiment.

FIG. 3 shows a possible implementation of one of the receiver system channels in the multi-channel receiver system 200 shown in FIG. 2, being comprised of a low noise amplifier (LNA) and preselector filter 300 and an RF digitizer 310. The LNA and preselector filter 300 allows weak signals of potential interest at frequencies of interest to be isolated and captured by RF digitizer 310. RF digitizer 310 includes a digitizer (i.e. analog-to-digital converter), generally with a sampling clock that is tied to an absolute time, and mechanism that time stamps digitized records with an absolute time such as a GPS based time, and can include a frequency translation and filtering circuit at its input such as a tunable superheterodyne receiver prior to its digitizer, or a digital frequency filtering and translation process after its digitizer, such as a digital down converter, or both or neither. The configuration and filtering parameters 210 can include controls for LNA & preselector filter 300, such as tuning or selecting the frequency passbands and stopbands, and controlling the gain, including bypassing amplifiers to enhance the system's dynamic range for different RF environments. The parameters 210 can also include controls for RF Digitizer 310, such as the frequency translation prior to the digitizer, the digitizer sampling rate, and the frequency translation after the digitizer and any filtering and decimation applied to the output of the digitizer in order to further isolate SoPI from other signals in the output digitized spectrum 350. The output of 350 is a set of digitized spectrums corresponding to the set of port voltages from the antenna ports.

Figure 4:
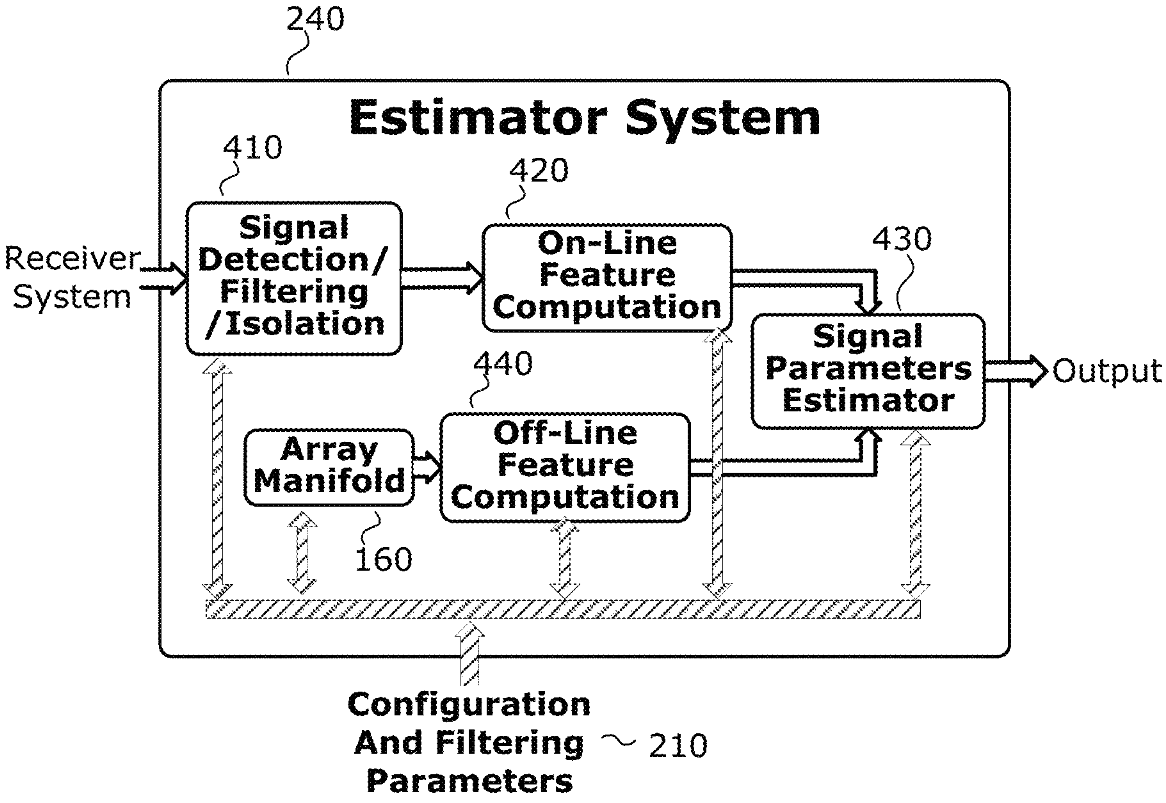
FIG. 4 is a functional block diagram illustrating an example arrangement for the estimator system of FIG. 2 according to an aspect of an embodiment.

FIG. 4 shows a possible implementation of one of the estimator system channels in the estimator system 240 shown in FIG. 2. The set of signals coming from the receiver system 130 are accepted by Signal Detection/Filtering/Isolation block 410, which can be pre-programmed with default pre-estimation SoI defining parameters or can receive pre-estimation SoI defining parameters from the configuration and filtering parameters 210. Pre-estimation SoI defining parameters distinguish an SoPI from other extraneous signals and noise. As mentioned, pre-estimation SoI defining parameters can include a set of frequency-hop parameters, such as the hop frequency spacing, hop rate, highest and lowest frequency, on and off durations, etc. Pre-estimation SoI defining parameters can also include ranges for an SoI's frequency, average magnitude, standard deviation of its magnitude over a parameterized time period, peak magnitude, bandwidth, modulation type (which can include if it is pulsed, packetized, continuous AM, FM, nPSK, QAM, hopped, OFDM, etc.) and parameters associated with the detected modulation type, such as the time duration of its pulse, or its packets, or a duty cycle, a repetition rate, hop parameters, etc. Pre-estimation SoI defining parameters could also include rejection criteria, such as parameters for a priori known interfering signals and noise sources that should be ignored.

In one embodiment, Signal Detection/Filtering/Isolation block 410 is configured to perform a JTFA and perform CFAR detection of signals matching the time durations and frequency ranges specified in the pre-estimation SoI defining parameters it receives from the configuration and filtering parameters 210. A JTFA is typically comprised of a series of overlapping discrete Fourier transforms (DFT) but can also be done by other techniques. For signals passing the pre-estimation SoI defining parameters tests, Signal Detection/Filtering/Isolation block 410 outputs either (A) a set of filtered signal bursts covering the SoI's detected time duration or a parameter specified time duration carried by the configuration and filtering parameters 210, each SoI output as a data record with $N_s$ time samples where each SoI can have a different $N_s$, or (B) a set of filtered signal bursts covering the SoI's detected bandwidth or a parameter specified bandwidth carried by the configuration and filtering parameters 210, each SoI output as a data record with $N_s$ frequency samples, where each SoI can have a different $N_s$, where, for each SoI, the frequency domain output record in B is related to the time domain output record in A by a Fourier Transform. In either frequency or time domain cases, the $N_p$ row matrix coming out of Signal Detection/Filtering/Isolation block 604*a* is associated with an SoPI having $N_s$ samples, forming an $N_p \times N_s$ matrix.

That set of filtered signal bursts, which correspond to the set of port voltages, is accepted by On-Line Feature Computation block 420, which computes a feature vector for each SoPI burst that is output by Signal Detection/Filtering/Isolation block 410 and passes the computed feature vector to Signal Parameter Estimator block 430.

The feature vector computation: (1) characterizes a received SoPI, (which can contain a single wavefront or have multipath terms arriving from different angles of arrival), (2) is a fully phase coherent process that achieves high processing gain, (3) is agnostic to the phase of the incoming signal and only considers the differences in phase between the ports, and (4) reduces a record with many ($N_s$) samples down to a feature vector with a small number of real numbers.

In a first configuration, which eliminates estimator bias caused by noise in the receiver and noise picked up by each antenna port that is independent of noise picked up the other ports, the features are found by cross-correlating one of the ports with all the other ports, and the feature vector has $2(N_p-1)$ real numbers.

In a second configuration, the features are found by cross-correlating each of the ports with all the ports, and the feature vector has $N_p^2$ real numbers. In other words, between the two configurations, the features are the cross-correlations between either (A) the digitized SoI records observed on the various ports in the antenna array, or (B) the digitized SoI record from a reference port and the digitized SoI records observed on the other ports in the antenna array.

The cross-correlations are done over a relatively large number of sample points (e.g., many narrow time samples over a long time period or many narrow band frequency-domain samples over a wide bandwidth), resulting in high processing gain. For example, on an SSB signal with 3 kHz of bandwidth voice syllables or energy bursts last, on average, about 0.5 seconds or more. A 0.5 second SoPI output record would have around 5000 data points to capture the 3 kHz bandwidth.

Continuing with the SSB signal example, the feature computation block 420 compresses the 3 kHz bandwidth energy that is spread across the many (5000 per port) data points on its input, to an effective processed bandwidth of 2 Hz and a low number of points on its output. For example, using the second configuration, a 6-port antenna array would generate around 6×5000=30000 points which would be compressed to a feature vector with only 36 real numbers. Using the first configuration, a 7-port antenna array would generate around 7×5000=35000 points which would be compressed to a feature vector with only 12 real numbers. The ratio of 2 Hz to 3 kHz ratio shows that for this example, the feature calculation process delivers about 32 dB of processing gain on each port. So, a weak signal with 7 dB of SNR which is marginally intelligible, will have a post-processing SNR of about 25 dB for the purposes of AoA estimation.

Off-Line Feature Computation block 440, using Array Manifold 160, either has precomputed, or computes, a set of matrixes needed by Signal Parameter Estimator 430, for each SoPI burst that is output by Signal Detection/Filtering/Isolation block 410. The matrixes needed by Signal Parameter Estimator 430 use the antenna system manifold to find, at the center frequency of each SoPI burst, the expected port outputs for a set of potential angles-of-arrival (azimuth and elevation) and for a set of two different and preferably orthogonal polarizations (e.g., vertical and horizontal or right and left hand circular polarization) (assuming the polarization of the incoming signal is also to be estimated) at each of the potential AoA's.

Signal Parameters Estimator 430 accepts the outputs from On-Line Feature Computation block 420, and Off-Line Feature Computation block 440, and uses a matching metric between the feature vector from On-Line Feature Computation block 420, and the matrixes from Off-Line Feature Computation block 440 to find a set of estimated signal parameters for each SoPI. In one embodiment, the estimated signal parameters include each SoPI's AoA, polarization parameters, magnitude, and if there are any associated multipath waves, how many there are, and each one's AoA, magnitude, phase, and polarization parameters. The polarization parameters are generally output as a Jones vector. Embodiments may also output a Stokes vector or other representations. Available for output are both the newly estimated signal parameters and the previously measured metrics allowing the signal to pass the pre-estimation SoI defining parameters tests. Also available are the time stamps applied to the SoPI bursts that generated the estimated signal parameters. Post-estimation SoI defining parameters could include ranges for one or more of the estimated signal parameters, such as ranges of angles of arrival to ignore or output, or polarizations to ignore or output. Either pre-defined/default post-estimation SoI defining parameters are used, or they are accepted from the configuration and filtering parameters 210. Only those signal parameters requested by the configuration and filtering parameters, and only for SoI meeting the SoI defining parameters are output from Signal Parameter Estimator 430, and thus RF characterization system 240.

Figure 5:
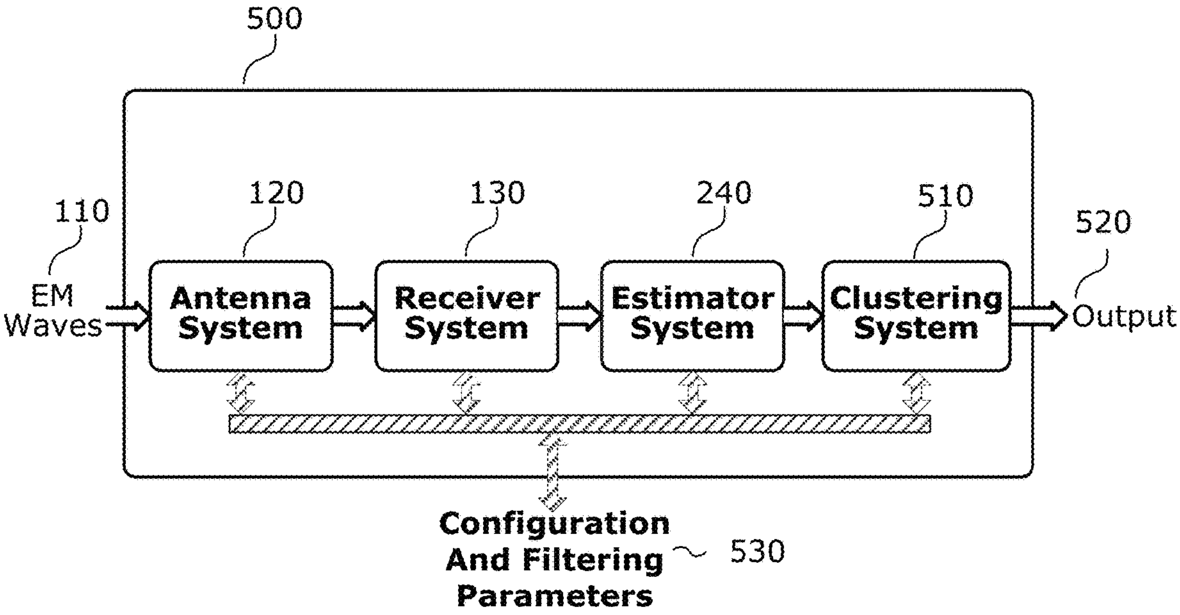
FIG. 5 is a functional block diagram of an RF emitter characterization system embodiment similar to the embodiment disclosed in connection with FIG. 2 but additionally including a clustering system according to one aspect of an embodiment.

The embodiment depicted in FIG. 5 is similar to that depicted in FIG. 4 but the RF characterization system 500 of FIG. 5 additionally includes a clustering system 510. The clustering system 500 accepts a series of signal parameters, including such items as AoA, magnitude, polarization, frequency, modulation type, time stamp (or number associated with timing) and other metrics measured so as to pass the various stages or levels of SoI defining parameters. The clustering system 500 can derive an emitter's velocity and range by fitting a curve to an SoI's magnitude's rate of change and acceleration over time. Because the clustering system 500 has multiple looks at an emitter, the clustering can improve the AoA estimation accuracy and reliability in that it can discard outliers and perform averaging. Having a priori knowledge of likelihoods that the SoI will be within a certain range of angles of arrival and not in other ranges of AoA would also allow improved AoA estimation performance. The clustering system 500 can group (or cluster) signals with a common AoA, or common AoA and polarization, allowing the clustering system 500 to isolate different emitters using the same frequency band, and allowing it to group and identify frequency hop sets used by different frequency hopping emitters, simplifying characterization and demodulation of hopping signals sent by a particular emitter.

The clustering system 510 also allows classification of emitters, such as moving versus stationary, by features such as how its polarization changes over time such as its randomness or its periodicity spectrum and the angular range over which it rotates. Configuration and filtering parameters 530 add additional parameters to those in configuration and filtering parameters 210. The additional parameters configure the clustering system 510 to optimize its performance under different operating scenarios. Configuration and filtering parameters 530 include such things as the number of estimates (or duration of time) the clustering system 510 should use to perform its clustering functions. Configuration and filtering parameters 530 can also include apriori probabilities that the SoI will be within a certain range of angles of arrival and probabilities that the SoI will not be in other ranges of AoA. Clustering system 510 can also use configuration and filtering parameters 530 to further isolate SoI from SoPI by filtering based on the addition parameters it generates. For example, parameters 530 may specify to only pass emitters that are stationary, or only those that are moving, or only pass those that are frequency hopping emitters, or pass all frequency hopping emitters that do not use a certain set of hop frequencies, or a certain frequency hop sequence, or a certain set of hoping frequency parameters.

In some embodiments, the estimator system generates an estimated AoA by finding, for a set of signals of interest, the angles in the array manifold that would produce port voltages most closely matching, according to a matching metric, those from each signal of interest (SoI). Different embodiments use different matching metrics and or different signal models to optimize the AoA estimation accuracy. For example, an embodiment may model the signal as being a single wavefront (i.e., a signal with no multipath) with a priori known polarization. When the polarization matches the model, and the signal actually has no accompanying multipath, this embodiment is capable of giving superior estimates. Some embodiments may model the signal as having multipath, where the polarizations of all terms are unknown and are estimated as part of the AoA estimation optimization process. This model is often the best performing model for some applications because, for example, (1) handheld radios and mobile radios are not held to be vertical or horizontal, but sway, and (2) signals almost always have a ground bounce reflection, and if the ground is tilted, or if the reflection is from a dihedral formed by random angle boulder edges or a tilted corner formed by a tree or building on tilted ground, the polarization will be rotated to an unknown angle. In some embodiments, the array manifold may be generated by combining an in-situ (as installed) measured array manifold and an array manifold generated via an EM simulator.

Besides signal models, matching metrics optimize different measures such as minimizing the mean square error (MMSE) (least squares) (Euclidean), minimizing the maximum error (mini-max), finding what is most likely (maximum likelihood), and other error minimization norms like H-infinity norm. Neural net based approaches aim to achieve similar combinations of high accuracy and robust performance in a wide variety of situations. Embodiments using a neural network require training with a large number of Monte Carlo noise instantiations added to all AoA and polarization combinations for all possible combinations of multipath terms, for every frequency in the array manifold, and preferably, many records of measured data with accompanying high accuracy truth data. While neural net based approaches require a lot of training data and compute time, once trained, they may be able to run with low latency on processors suitably small for portable systems.

Besides the signal model and the different measures for what is being optimized, the matching performance is affected by biases in the estimation process. Some estimator system embodiments are capable of jointly estimating the bias along with the AoA, mag/phase, and polarization of an incoming signal, and as such, minimize the impact of biases.

The above operations and all operations described herein can be carried out by one or more components of digital electronic circuitry, computer hardware, firmware, and software, for example, a suitable programmed processor or set of processors and associated memory which can include read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM and DVD disks.

Implementations may also include one or more programmable processors, and one or more computer program products tangibly embodied in a machine-readable storage device for execution by one or more programmable processors. The one or more programmable processors can each execute a program of instructions to perform desired functions by operating on input data and generating appropriate output. Generally, the processors receive instructions and data from the memory. Any of the foregoing may be supplemented by, or incorporated in, specially designed ASICs (application-specific integrated circuits). These components may be physically centralized or be partially or wholly distributed throughout the embodiment.

The above-described arrangements bestow particular advantages from use as an antenna system 120 of antennae as described in U.S. Pat. No. 9,279,880 and U.S. patent application Ser. No. 17/038,600, both incorporated by reference above. These antennae may be balanced or unbalanced. These antennae may or may not include a reference port.

According to an aspect of an embodiment, the two or more port multiport antenna is comprised of two or more conductive pieces with two or more ports physically distributed around the two or more conductive pieces, each port having two terminals, a first terminal and a second terminal, wherein each port's first terminal is connected to one conductive piece, and each port's second terminal is connected to a different conductive piece, and at least two of the ports form current loops through each other via their connection to the two or more conductive pieces, wherein, for the purposes of explanation, each current loop has an axis, the axis being perpendicular to the plane centered on the loop and containing the at least two ports.

Figure 6:
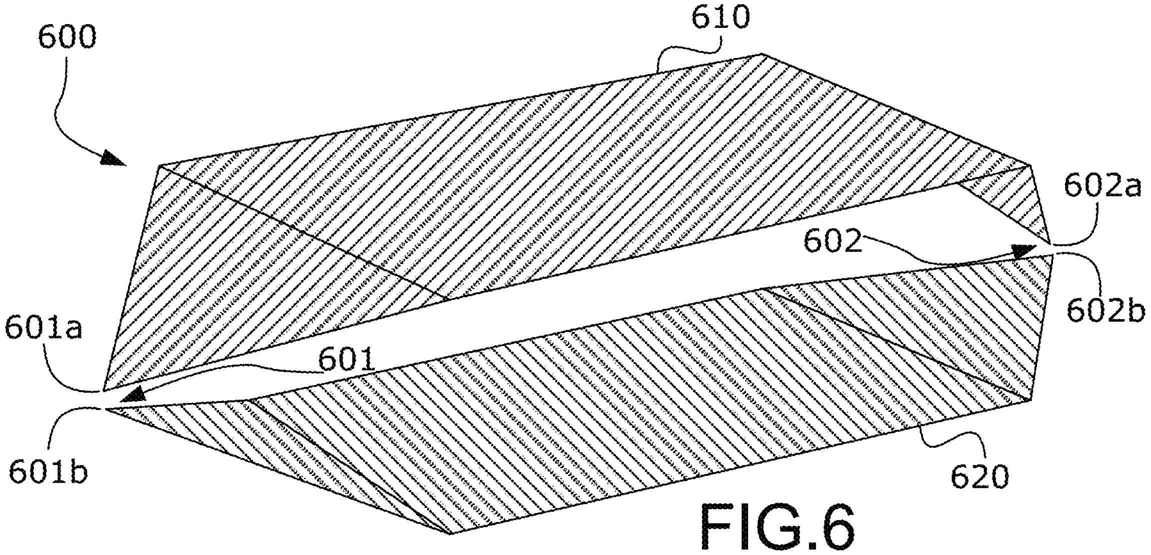
FIG. 6 is an embodiment of a multiport antenna with two ports and two flat tapered conductive pieces.

FIG. 6 shows the antenna element 600 in a balanced configuration. The antenna element 600 can be described as a pair of conductive surfaces 610 and 620 offset from one another with a pair of ports, first port 601 and second port 602, where each port is formed by a connection to the two conductive surfaces 610 and 620 such that a loop is formed going from a first terminal 601*a* of the first port 601, through the first conductive surface 610 to the first terminal 602*a* of the second port 602, through the second port 602 to its second terminal 602*b*, and through the second conductive surface 620 to the second terminal 601*b* of the first port 601, and through the first port 601 back to its first terminal 601*a* to complete the loop. The construction has the property that the H-field sensing current loops have current flowing through the same shared conductive pieces and across the same shared terminals of the same set of physically distributed ports, that are sensing E-fields, the E-fields inducing a voltage across those same ports.

That all the ports contain both an E and H field induced output voltage component allow the ports to have well-defined patterns that are useful for direction finding, even when the antenna is extremely electrically small (i.e., at very low frequencies where the antenna's dimensions are less than 1⁄10 of a wavelength), and even when the antenna is electrically large (i.e., at high frequencies where the antenna's dimensions are multiple wavelengths). The width of conductive strips 610 and 620 along with the offset distance between them (i.e., the antenna's height) establishes the capacitance between the conductive strips and the antenna's sensitivity to low frequency E-fields. The area of the loop establishes the antenna's sensitivity to the H-field at low frequencies. By adjusting the length, width, height, and port termination impedance, the E and H field sensitivities can be made to match. By matching the sensitivities, the antenna produces two cardioid patterns with a high front-to-back ratio, one from each port, which is advantageous for direction finding or simply nulling signals that are interfering with a signal of interest. Many electronic components (e.g. transmission lines, amplifiers, mixers, baluns, etc.) are designed to work with a 50-ohm unbalanced impedance, or a 100-ohm balanced impedance. The antenna embodiment of FIGS. 6 and 7 allows construction with dimensions optimized to inherently provide high quality cardioid patterns with standard termination impedances. Choosing to use standard termination impedances has the advantage of eliminating the need for matching networks, with their bandwidth limiting and lossy characteristics.

The conductive strips 610 and 620 are shown has having the same size and shape and oriented to be oppositely symmetrical, which makes the antenna balanced, and makes the antenna ignore E-field components aligned with the axis running between the centers of the port terminations.

Figure 7:
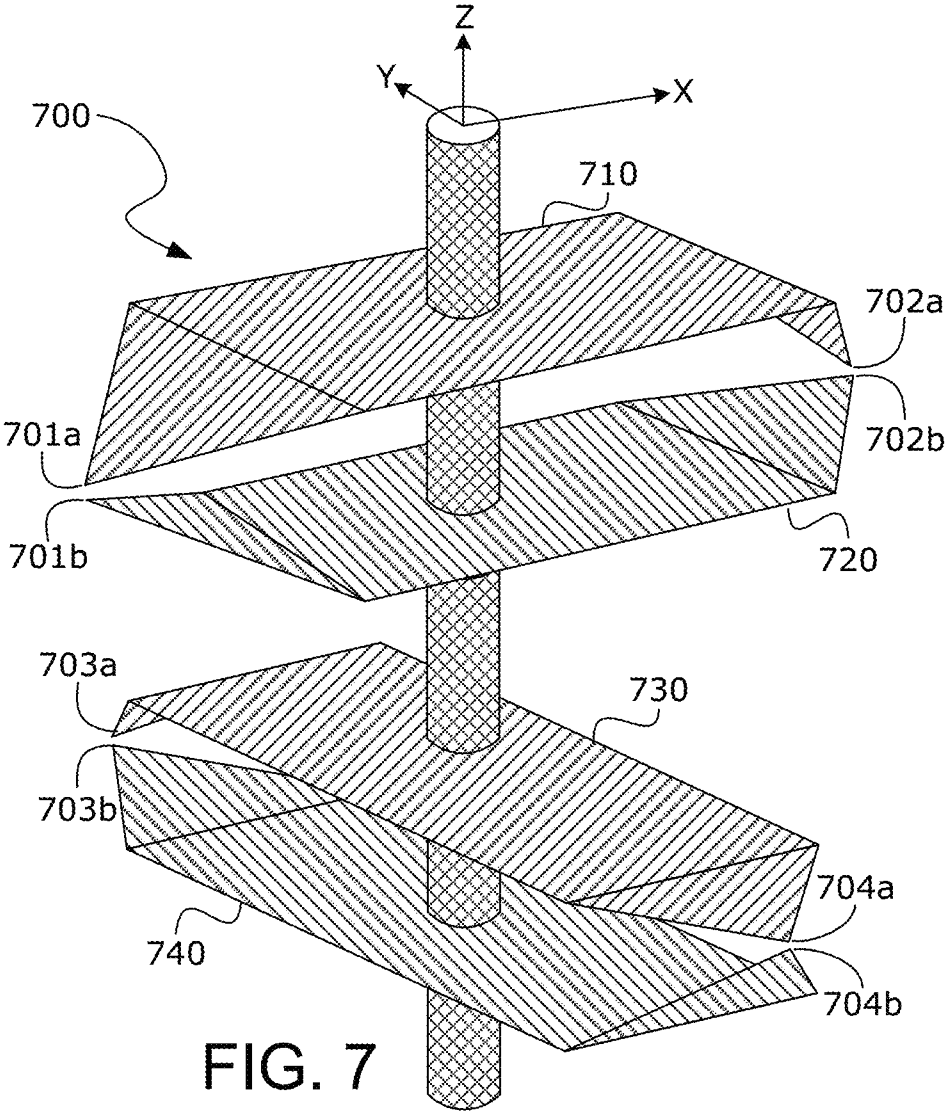
FIG. 7 is an embodiment of an antenna system comprised of two multiport antennas oriented in different directions, each with two ports and two flat tapered conductive pieces.

FIG. 7 shows two of the FIG. 6 antenna elements oriented as a crossed pair, where both antenna elements sense a vertical Ez-field component, and the top element with strips 710 and 720 senses an Hy component and the bottom element with strips 730 and 740 senses an Hx component. Also shown in FIG. 7 are terminal pair 701*a*, 701*b*, terminal pair 702*a*, 702*b*, terminal pair 703*a*, 703*b*, and terminal pair 7041*a*, 704*b*, each terminal pair respectively defining a port.

Figure 8A:
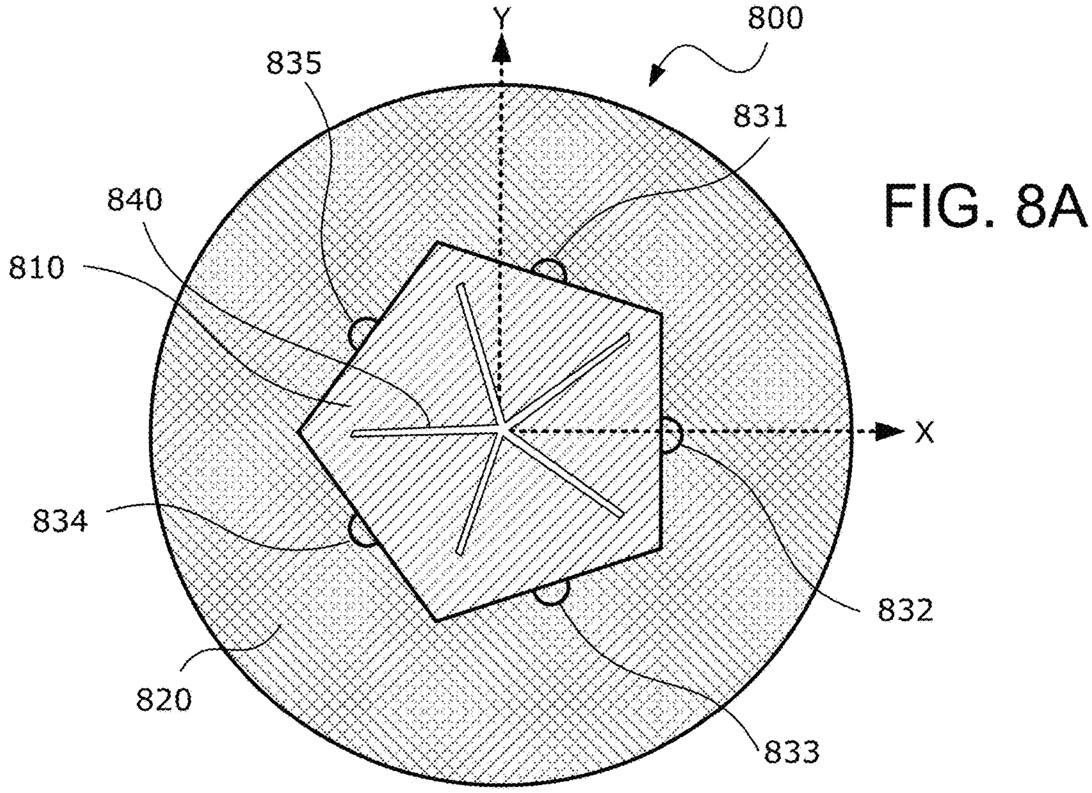
FIG. 8A and FIG. 8B are a plan and perspective view, respectively, of an embodiment of a multiport antenna according to an aspect of a disclosed embodiment.
Figure 8B:
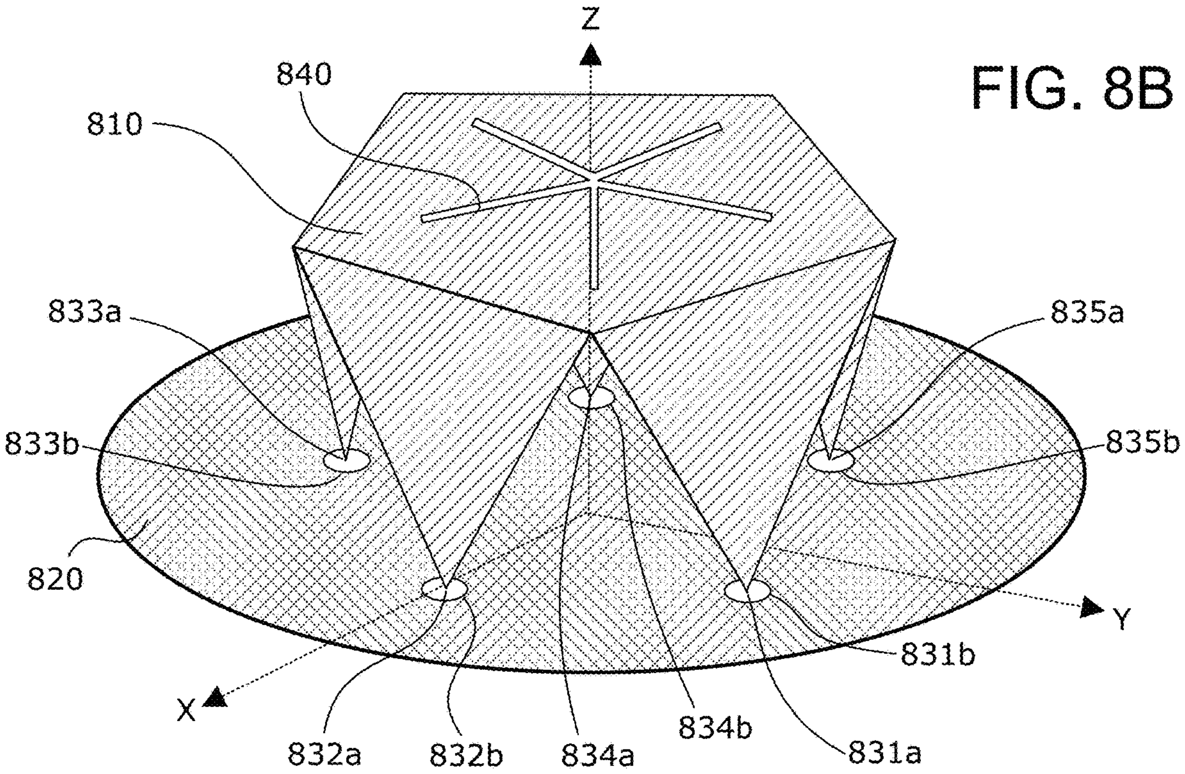

FIGS. 8A and 8B illustrate, using a top and perspective view, respectively, an embodiment of a multiport antenna 800 with two conductive pieces and five ports, each port having a first and a second terminal, where the first terminal of all five ports connects to a first conductive piece, and where the second terminal of all five ports connects to a second conductive piece, and where the ports are physically distributed. It is representative of similar embodiments with other numbers of ports or with the ports spaced unequally or with neither conductive surface being planar. Whereas the antenna elements depicted in FIGS. 6 and 7 have two symmetrically shaped conductive sheets with equal size, making the antenna balanced and insensitive to horizontal E-field components, the antenna element depicted in FIGS. 8A and 8B is just the reverse, where the two conductive sheets have different sizes and shapes, and where a horizontal E-field component can be sensed because the horizontal E-field can induce un-equal voltages between one or more pairs of ports.

More specifically, FIGS. 8A and 8B illustrate an embodiment of a multiport antenna 800 with two conductive pieces, a first conductive piece 810 and a second conductive piece 820, and five ports 831, 832, 833, 834, and 835. Each port has a first and a second terminal. The perspective view shown in FIG. 8B labels the first terminal of each of the ports with the letter "a", as in terminal 831*a*, 832*a*, 833*a*, 834*a*, and 835*a*, which all are electrically connected to first conductive piece 810. The second terminal of each of the ports, terminals 831*b*, 832*b*, 833*b*, 834*b*, and 835*b*, is electrically connected to the second conductive piece 820. As such, the first terminal of all five ports connects to the first conductive piece 810, the second terminal of all five ports connects to the second conductive piece 820, and the ports are physically distributed. The illustrated port arrangement allows a high degree of flexibility in the physical structure of the port terminations, including a coaxial cable or coaxial connector or other components such as a transformer, or choke-balun, or stripline, or microstrip line etc.

In one embodiment, the ports themselves are coaxial in the sense that the first conductive piece 810 is shaped so that every port's first terminal can be a center conductor, by virtue of it being the tip of a triangular piece, and the second conductive piece 820 is shaped so that the each port's second terminal is a surrounding structure, that is, a hole, that forms a coaxial shield connection, connecting to the second conductive piece 820. The coaxial port configuration as just described allows every port to have a direct wide-band connection without any band limiting, or reliability limiting, or weight adding component such as a balun. Moreover, it allows the antenna to made easily configurable since a port can attach to a coaxial switch that can be configured to select between different terminations, such as a short, open, or a specific impedance, or select between bypassing or using an amplifier, or select between different filters in a filter bank. It also allows extremely low system noise figures because a low noise amplifier can be connected to the coaxial port, effectively without an intervening lossy cable. Of course, it will be apparent to one having ordinary skill in the art that other termination configurations may be used.

Also as shown in FIGS. 8A and 8B, in some embodiments the antenna 800 may have an overall box-like shape with one of the conductive pieces being substantially planar and the other conductive piece having a substantially planar portion spaced away from and substantially parallel to the substantially planar conductive piece. Here 'substantially planar" and "substantially parallel" means sufficiently close to planar or parallel that electrical performance is not unduly affected.

As described above, a coaxial port configuration facilitates the antenna system being made configurable because a port can attach to a coaxial switch that can be configured to select between different terminations, such as a short, open, specific impedance, or specific length of transmission line, or select between bypassing or using an amplifier, or select between different filters in a filter bank. Each termination-configuration would require an associated array manifold. Similarly, the receiver system 130 may also have different configurations that present different termination impedances to the antenna, particularly at different frequencies, or with different cable lengths. Configuration and filtering parameters 210 can be used to communicate an appropriate manifold to estimator system 240 based on how the DF system configuration impacts the antenna's port terminations. Communication of the manifold via configuration and filtering parameters 210 allows the same system hardware to be easily and quickly used in different installations. In this case, the estimator system 240 would accept as part of the configuration and filtering parameters 210 or 530, an "as installed" array manifold for that particular installation.

These are merely examples of antenna elements that may be incorporated into the RF emitter characterizers described herein. Other suitable antenna elements may be found in U.S. Pat. No. 9,279,880 and U.S. patent application Ser. No. 17/038,600.

Figure 9A:
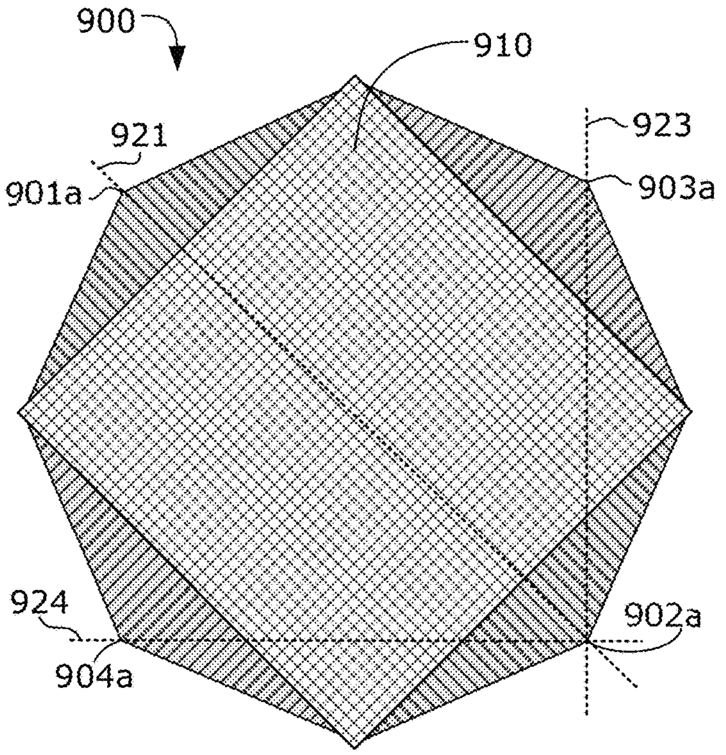
FIG. 9A and FIG. 9B are a plan and perspective view, respectively, of an embodiment of a multiport antenna according to an aspect of a disclosed embodiment.
Figure 9B:
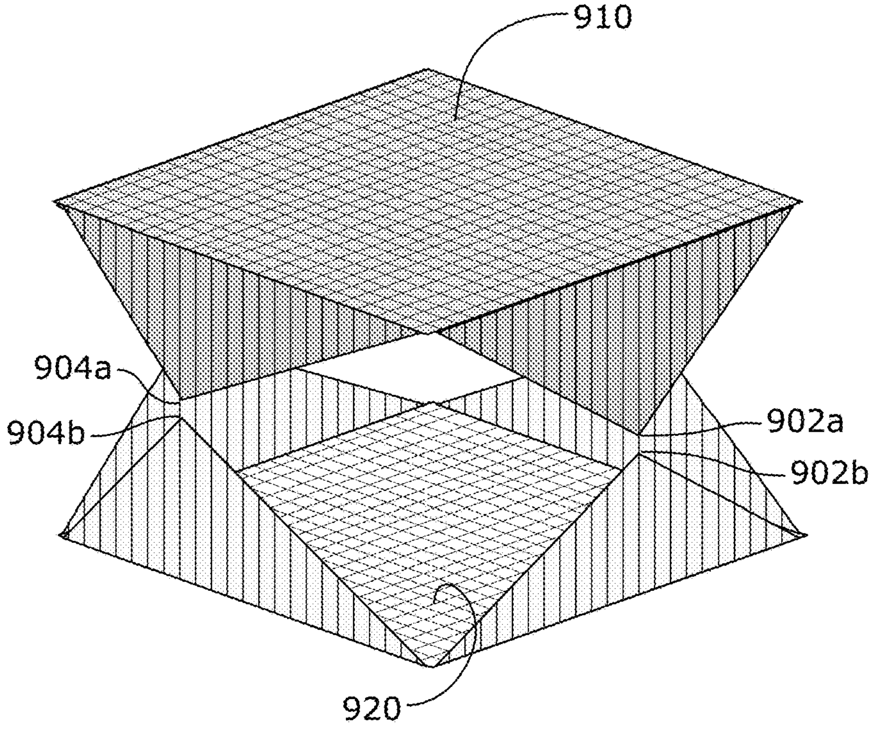

FIGS. 9A and 9B show a configuration in which, like FIGS. 8A and 8B, there are two conductive elements 910 and 920, but unlike FIGS. 8A and 8B, the two conductive elements are symmetrical to each other such that they form balanced, as opposed to unbalanced, ports. Each conductive element is made up of an eight sided polygon with four corners folded to create a generally rectangular planar portion having the configuration of an inscribed rectangle with four vertices at midpoints along the edges of the original polygon and where conductive element 910 has four downward oriented portions and conductive element 920 has four upward oriented portions, the upward and downward oriented portions forming a port where the vertexes nearly meet, the four vertices forming ports 901, 902, 903 and 904. Each port has a first terminal labeled with the letter "a", as in terminal 901*a*, 902*a*, 903*a* and 904*a*, which all are electrically connected to first conductive piece 910. Each port has a second terminal labeled with the letter "b", as in terminal 901*b*, 902*b*, 903*b* and 904*b*, which all are electrically connected to the second conductive piece 920. Construction lines 921, 923, and 924 show the orientation of the loop through ports indicated by the last two digits of the construction line's label, ports 2-and-1, 2-and-3, and 2-and-4, respectively, where, for example, the loop depicted by construction line 921 through ports 2-and-1 starts at the second terminal 902*b* of the second port 902, through conductive element 920 to the second terminal 901*b* of first port 901, through port 901 to its first terminal 901*a*, through the first conductive element 910 to the first terminal 902*a* of the second port 902, and through port 902 to its second terminal 902*b* to complete the loop. Each loop has an axis, the axis being perpendicular to the plane centered on the loop and containing the two ports, where an edge of the plane is indicated by its associated construction line, which for the case of ports 902 and 901 is construction line 921. A similar set of three construction lines (and three loops) exists for each of the ports. Each loop is sensitive to an H-field component aligned with the axis of that loop. As such, the illustrated four port antenna is sensitive to at least four H-field components, depending on the coordinates or spacing of the ports. Similarly constructed antennas with more than four ports could add additional loops oriented to directly sense additional H-field components.

The displacement spacing between the generally rectangular planar portions of conductive elements 910 and 920 causes the antenna to be sensitive to an incoming E-field component aligned with the displacement spacing. As such, each port senses multiple EM field components, including an E-field component, and H-field components. At low frequencies (i.e., frequencies where the antenna is electrically small) all ports contain a common voltage induced by the incoming aforementioned E-field component, and each port also senses a voltage cause by the current flowing around each loop associated with that port, each loop having a current induced by the H-field component aligned with the axis of that loop. As illustrated, with the antenna oriented so the substantially planar sections of 910 and 920 are horizontal and displaced vertically, the four port antenna simultaneously senses three components, Ez, Hx, and Hy. As such, it can find the direction to any wave with a vertically polarized component, but cannot sense, and is blind to, a horizontally polarized wave from any direction. An array comprised of two such multiport antennas can have its antennas oriented so that they sense nominally orthogonal E-field components, such as Ez and Ex, as well as all three H-field components, Hx, Hy, and Hz. In this case the pair of antennas is not blind to any wave but has an AoA ambiguity for a wave arriving with a polarization and at an angle where the only E-field component is an Ey component. An array of three such antennas oriented to sense all three E-field components supports unambiguous AoA estimation of any incoming wave.

Figure 10A:
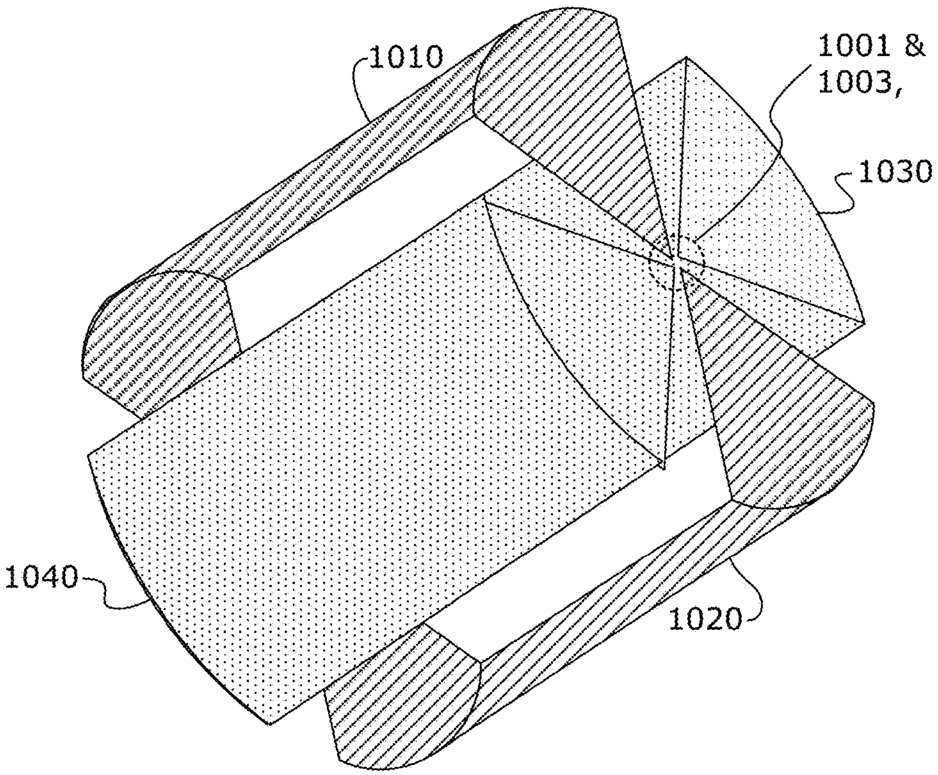
FIG. 10A is a perspective view of an embodiment of a multiport antenna according to an aspect of a disclosed embodiment.
Figure 10B:
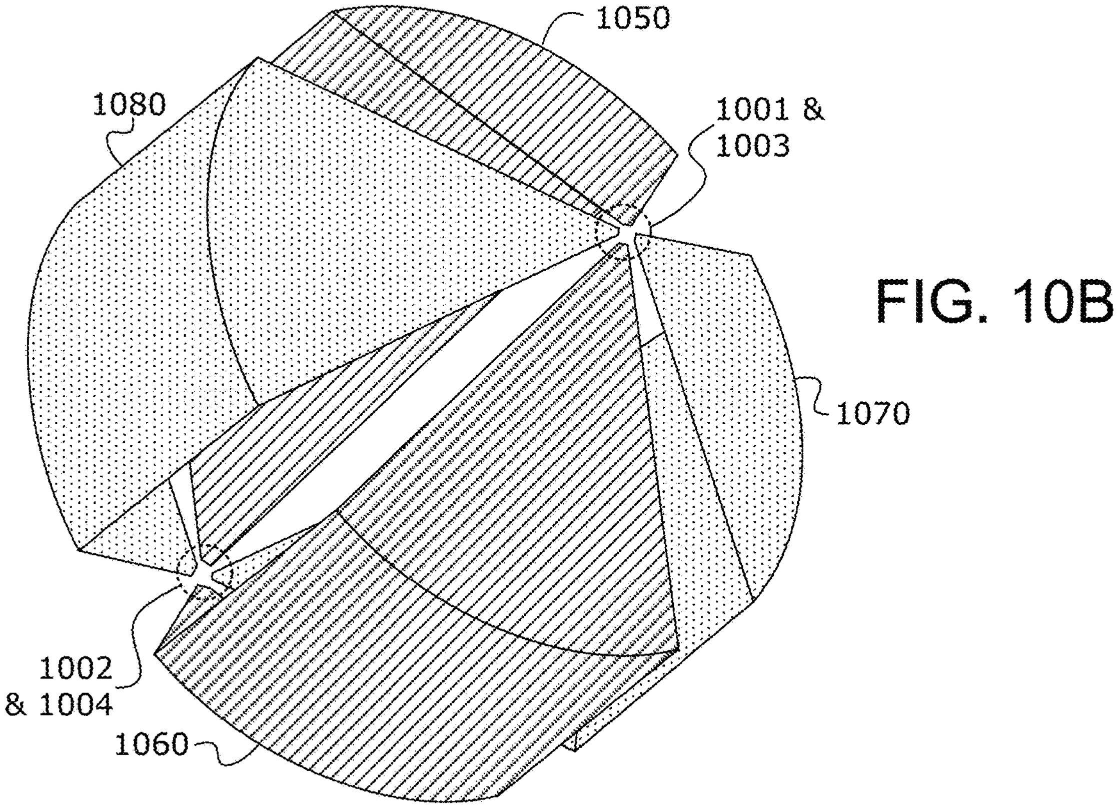
FIG. 10B is a perspective view of an embodiment of a multiport antenna according to an aspect of a disclosed embodiment.

FIG. 10A is a perspective drawing of a multiport antenna according to an aspect of an embodiment comprised of four conductive surfaces 1010, 1020, 1030, and 1040 that together have an overall outside cylindrical configuration with generally planar ends. FIG. 10B is a perspective drawing of a multiport antenna according to another aspect of an embodiment comprised of four conductive surfaces 1050, 1060, 1070, and 1080 that together have an overall outside cylindrical configuration with generally conical ends. In both arrangements there are four ports, 1001 and 1003 at the first end of the cylindrical shape and 1002 and 1004 at the second end of the cylindrical shape. The ports 1001 and 1003 are shown in an expanded view in FIG. 10C with their respective terminal connections 1001*a*, 1001*b* and 1003*a*, 1003*b*. Similarly, ports 1002 and 1004 are shown in the expanded view of FIG. 10D with their respective terminal connections, 1002*a*, 1002*b* and 1004*a*, 1004*b*.

Figure 10C:
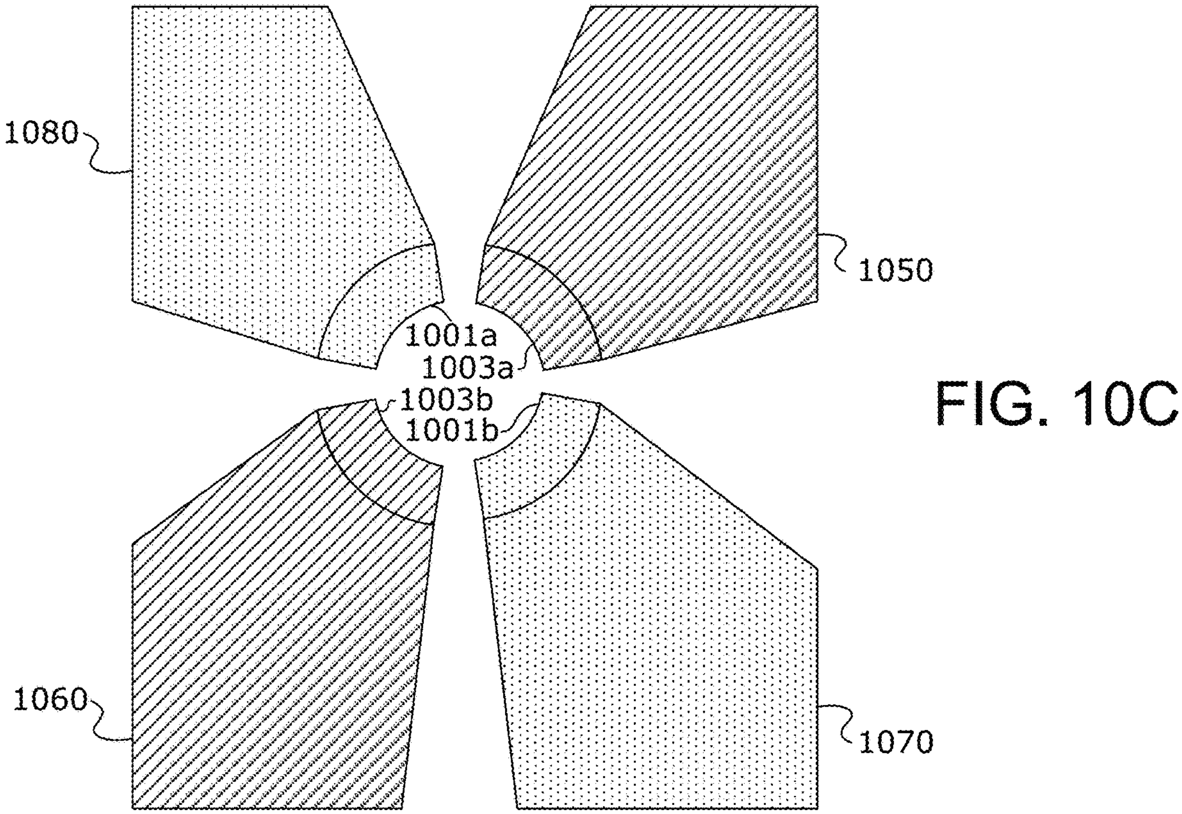
FIG. 10C is a plan view of one end of the multiport antenna of FIG. 10B.
Figure 10D:
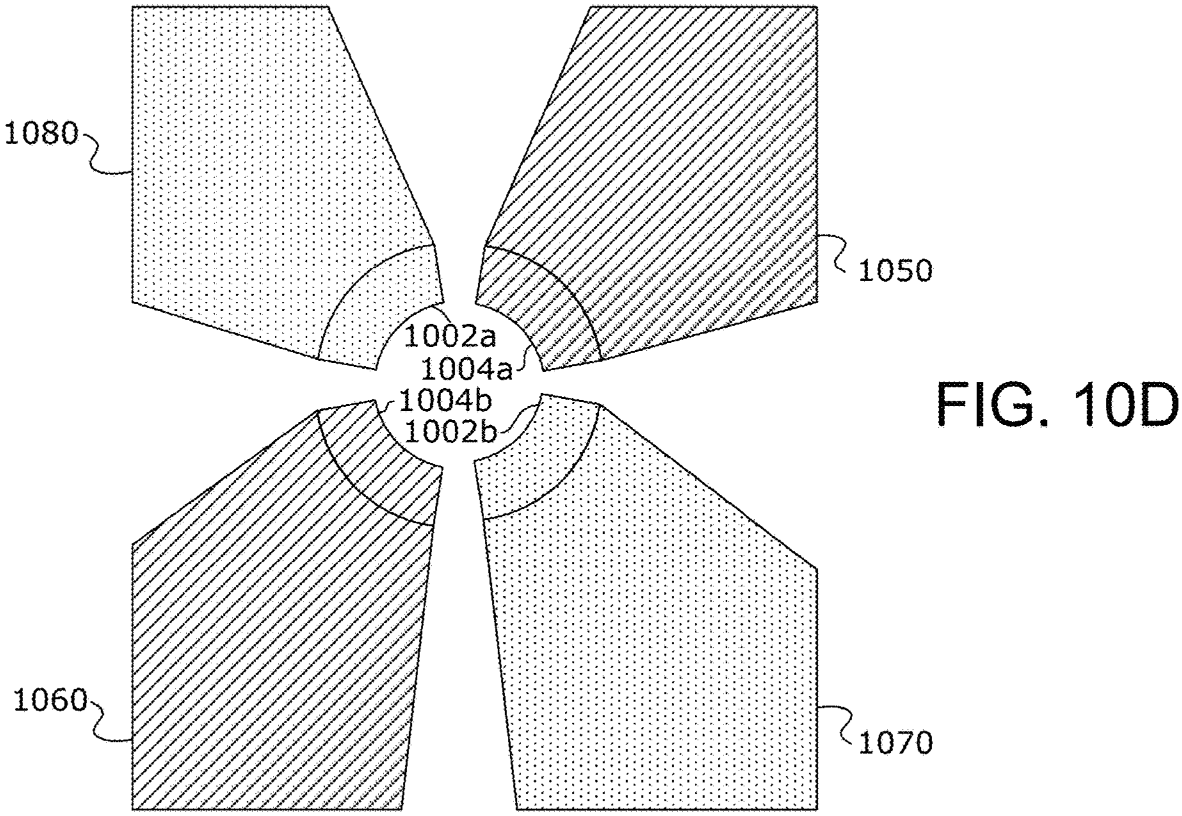
FIG. 10D is a plan view of the other end of the multiport antenna of FIG. 10B.

The four conductive surfaces in FIGS. 10B, 10C, and 10D include (1) a first pair of conductive surfaces made up of the first conductive surface 1070 and the second conductive surface 1080 and (2) a second pair of conductive surfaces made up of the first conductive surface 1050 and second conductive surface 1060. The conductive surfaces of the arrangement shown FIG. 10A may be conceptualized in a similar manner. The conductive surfaces of each pair connect to each other through their ports, the ports thus also occurring in pairs. The conductive surfaces in a pair thus form a loop, one of the ports in a port-pair being located at one end of the cylinder as shown in FIGS. 10B and 10C, and the other port in that port-pair being located at the opposite end of the cylinder as shown in FIGS. 10B and 10D. Each port has a first terminal and a second terminal, wherein the first terminal (i.e., the terminals designated "a" in FIGS. 10C and 10D) of each port in the port-pair connects to the first conductive surface in the pair of conductive surfaces, and wherein the second terminal (i.e., the terminals designated "b" in FIGS. 10C and 10D) of each port in the port-pair connects to the second conductive surface in the pair of conductive surfaces.

In FIGS. 10A and 10B ports 1001 and 1002 are a port-pair where port 1001 is at the first end of the cylindrical shape shown in FIG. 10A or 10B, and port 1002 is at the opposite end of the cylindrical shape shown in FIG. 10A or 10B. Port 1001 has its first terminal 1001*a* connected to the first conductive surface 1080 in the pair of conductive surfaces 1080, 1070 and has its second terminal 1001*b* connected to the second conductive surface 1070 in the pair of conductive surfaces. Port 1002 has its first terminal 1002*a* connected to the first conductive surface 1080 in the pair of conductive surfaces 1080, 1070 and has its second terminal 1002*b* connected to the second conductive surface 1070 in the pair of conductive surfaces. Port-pair 1003 and 1004 connect to the pair of conductive surfaces 1050, 1060 similarly.

The arrangement of the conductive surfaces and port connections in FIGS. 10A and 10B allow for two EM field components, an E-field component and an H-field component, to be sensed by each port, and to be separable from the outputs of the port-pair. Between the four ports, four EM field components are sensed, two E-field components and two H-field components. As in the embodiments of FIGS. 6, 7, 8, and 9, the embodiments of FIGS. 10A and 10B can have their height, width, and length adjusted to provide inherent cardioid patterns when their ports are terminated in standard impedances like 50, 75, and 100 ohms, etc.

Regardless of its orientation, between the four sensed EM field components, the antenna of FIG. 10A or 10B is sensitive to any polarization wave coming in from any angle. As such, no signal can be missed. The antenna also provides for direction finding on any polarization wave coming from nearly any angle. For example, suppose the antenna is oriented with (a) the axis of the cylindrical shape aligned with the Z-axis, and (b) the axis of the loop formed by a first pair of conductive surfaces and first port-pair connecting them aligned with the X-axis. With this orientation, the first port-pair senses Ey and Hx, and the other port-pair senses Ex and Hy. A TEM wave, regardless of polarization and angle-of-arrival, always has at least one of these EM field components and will thus always be sensed. Knowledge of these four EM field components provides the potential for unambiguous direction finding on all wave polarizations and arrival angles except for an ambiguity (e.g., an east/west ambiguity) for a wave with the combination of (a) being perfectly vertically or horizontally polarized and (b) arriving exactly at the horizon. In a preferred RF emitter characterization system embodiment, the antenna is oriented to minimize or eliminate the likelihood that a wave would arrive with a polarization and direction that could be ambiguous, by virtue of a priori knowledge of where signals of interest are in a particular environment. In another preferred RF emitter characterization system embodiment, an additional element is added to the RF emitter characterization system and oriented so it can sense one or usually preferably both of the missing EM field components.

Provision of a second multiport antenna element oriented so it senses the missing EM field components missed by the first multiport antenna element provides for unambiguous direction finding on any polarization wave from any angle. Moreover, a two element system where each element senses two E and two H field components fits in a smaller volume of space than a three element system where each element senses one E and one H field component, such as the elements shown in FIGS. 6 and 7. Since the sensitivities of equal-volume two-port and four-port antenna elements are nominally equal, this reduction in the number of elements allows smaller yet better performing DF systems to be built.

FIGS. 10A and 10B show two different embodiments that are connected identically but the conductive surfaces in FIG. 10A are shown to have portions bent to be orthogonal to the axis of the cylindrical shape to create a generally flat-ended configuration, whereas in FIG. 10B, the portions are bent to a non-orthogonal angle to create a generally conically-ended configuration. The overall cylindrical profile is optional. The antenna can be configured in other shapes, such as shapes having a generally rectangular or square or conformal cross-section rather than round. Similarly, the shaping at the ends can be different from one another and made conformal as preferred in any specific implementation. The end shaping for different pairs of surfaces can also be made different.

Figure 11A:
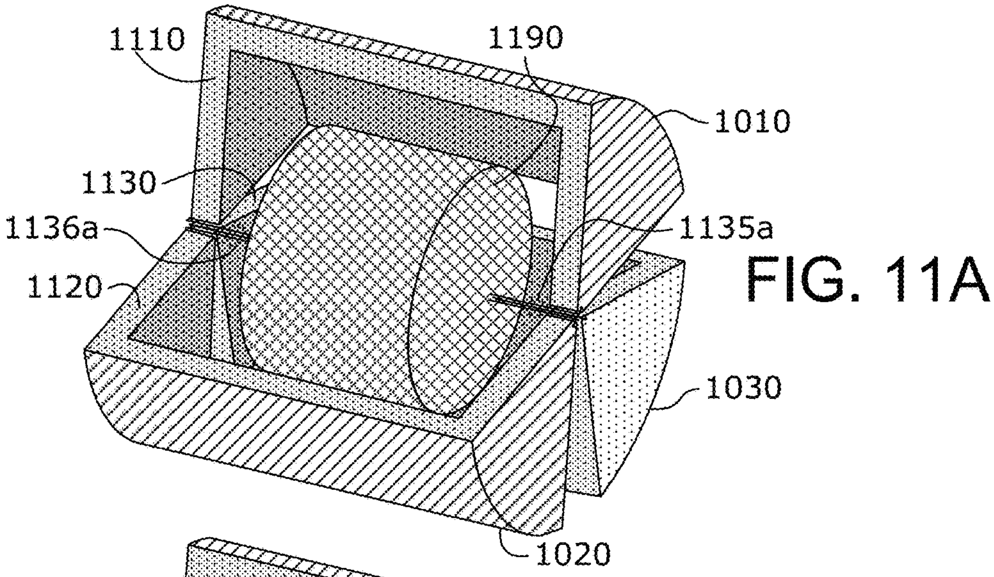
FIGS. 11A and 11B are perspective views of embodiments of a multiport antenna according to aspect of disclosed embodiments.
Figure 11B:
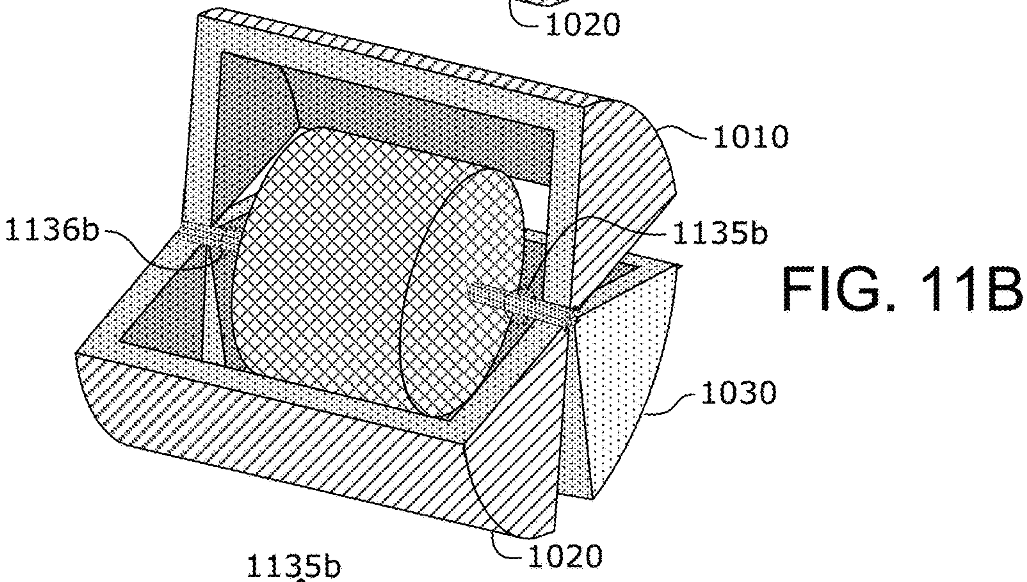
Figure 11C:
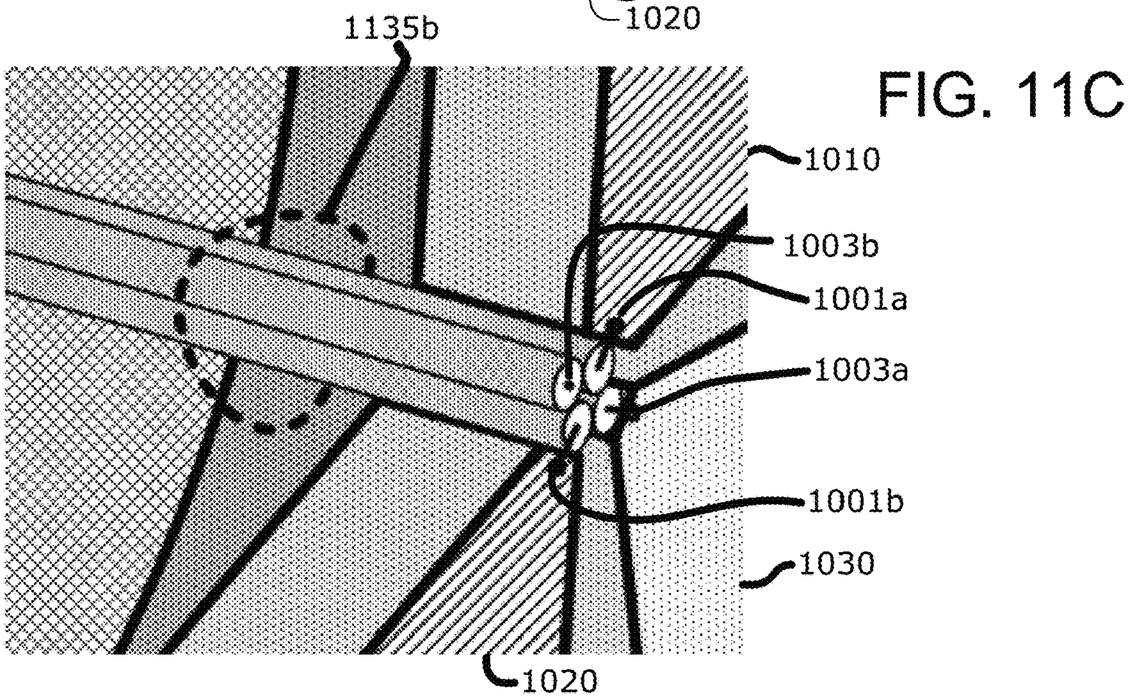
FIG. 11C is a close up view of a portion of the embodiment of FIG. 11B.
Figure 11D:
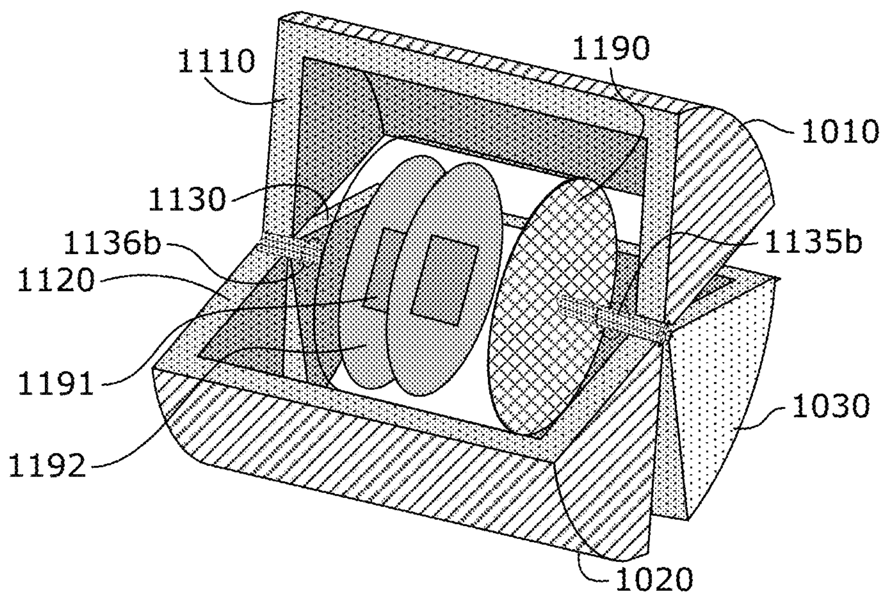
FIG. 11D is a perspective view of an embodiment of a multiport antenna according to an aspect of a disclosed embodiment.

FIGS. 11A, 11B, and 11D show a configuration which is similar to that shown in FIG. 10A but has cut-out views where conductive surface 1040 is hidden to expose the inside of the antenna and to show how the antenna may include additional features used in some embodiments. In other words, FIGS. 11A, 111B, and 11D show FIG. 10A's first pair of conductive surfaces 1010 and 1020, and of the second pair of conductive surfaces it shows conductive surface 1030 but not conductive surface 1040. FIGS. 11A, 11B, and 11D thereby show details of several embodiments that can be comprised of one or more additional features relative to FIG. 10A.

As can be seen, the conductive surfaces together define an at least partially enclosed interior volume. For some applications it may be advantageous to provide a lining to the conductive surfaces that provides enhanced sensitivity to the H-field picked up by a conductive surface pair. FIGS. 11A, 11B, and 11D show a lining 1110, 1120, and 1130 provided on the inside of the conductive surfaces 1010, 1020 and 1030, respectively, that line the loop formed by the conductive surface pairs, where a similar lining 1140 on conductive surface 1040 is hidden due to the cut-out view. The linings can be made from a material having a high magnetic permeability, i.e., a high mu material. The high mu material may use, for example, powdered iron, NiZn, or MgZn along with other elements to achieve better permeability properties that result in greater H-field sensitivity over desired frequency ranges, that is, more output power from the ports for a given incoming field strength. It will be apparent to one of ordinary skill in the art that other high mu materials may be used alone or in combination. Embodiments can also use high mu material to equalize a port-pair's sensitivity to an incoming E and H field at different port termination impedances, allowing additional freedom in sizing the antenna. This flexibility can be advantageous in DF applications since the best DF performance is generally achieved when the E and H sensitivities are equal, or in other words, when they are sensed with equal SNR.

FIGS. 11A, 111B, and 11D also show a conductive enclosure 1190 that is positioned within the interior volume defined by the conductive surfaces of the antenna. Enclosure 1190 can house and shield arbitrary items including an electronics package containing radio transmitters/receivers, optical transmitters/receivers, cameras, digitizers, and processors. As such, the electronics package contained in enclosure 1190 in some embodiments receives the signals coming from the antenna ports and performs functions such as detecting the presence of signals, measuring the magnitude of signals, demodulating signals, measuring the angle-of-arrival of signals, capturing the waveforms of signals, measuring the time delay between signals, etc.

FIGS. 11A and 11B also show different embodiments for transmission lines to bring signals from the antenna's ports to the enclosure 1190. FIG. 11A shows a bundle 1135*a* with a pair of twin lead cables going to the first port and third port on one end of the cylindrical profile, and cable bundle 1136*a* going to the second port and the fourth port on the other end of the cylindrical profile. Each bundle is shown comprised of two twin-lead pairs, where each twin-lead is a differential pair attached to the first and second terminals of a port. FIG. 11B shows a bundle 1135*b* on one end, and a similar bundle 1136*b* on the other end, where each bundle is two pairs of coaxial cable, and each pair of coaxial cables is a differential pair with their center conductors attached to the first and second terminals of a port. The shields of these bundles stop with a small gap offsetting them from the antenna's conductive surfaces and are connected together where they end, allowing differential currents to flow through the center conductors.

FIG. 11C is an exploded view showing the antenna's port connections on one end of the antenna of FIG. 11B. The antenna's first port 1001 has its first terminal 1101*a*, on conductive strip 1010, connected to the center conductor of the first coaxial cable in a first cable-pair, and has its second terminal 1001*b*, on conductive strip 1020, connected to the center conductor of the second cable in the first cable-pair. The antenna's third port 1003 has its first terminal 1003*a*, on conductive strip 1130, connected to the center conductor of the first coaxial cable in the second cable-pair, and has its second terminal 1103*b*, on the hidden conductive strip 1040 connected to the center conductor of the second cable in the second cable-pair. The ports on the opposite end of the cylindrical shape would connect similarly.

From these transmission line embodiments, it will be obvious to one skilled in the art that other transmission line bundles with other structures or configurations are also valid, including each bundle having different termination mountings or bundles being comprised of a pair of shielded twin lead, a pair of shielded twin lead within a common shielded, or any of these where the twin lead is a twisted pair. In addition, a balun could be used on an antenna port so that a single coaxial cable, instead of two, could be used to bring the signal from an antenna port into the enclosure. All these configurations can also be used to bring the signal from the ports to an external system rather than the internal enclosure 1190.

FIG. 11D shows an embodiment which includes the enclosure 1190 with its sidewall hidden in order to show an embodiment of the contents inside enclosure 1190. The enclosure 1190 can contain an electronics package 1191 arranged on one or more substrates 1192 such as printed circuit boards (PCBs) mounted inside enclosure 1190. An electronics package 1191 is connected to the antenna with through cable bundles 1135*a* and 1136*a* as described above, and to other components outside the enclosure 1190 via additional wiring or optical or other wireless means. The electronics package 1191 may include RF transmitters/receivers, digitizers, as well as optical components such as cameras, lenses, and optical transmitters/receivers, as well as processors and power conditioning components.

Figure 12:
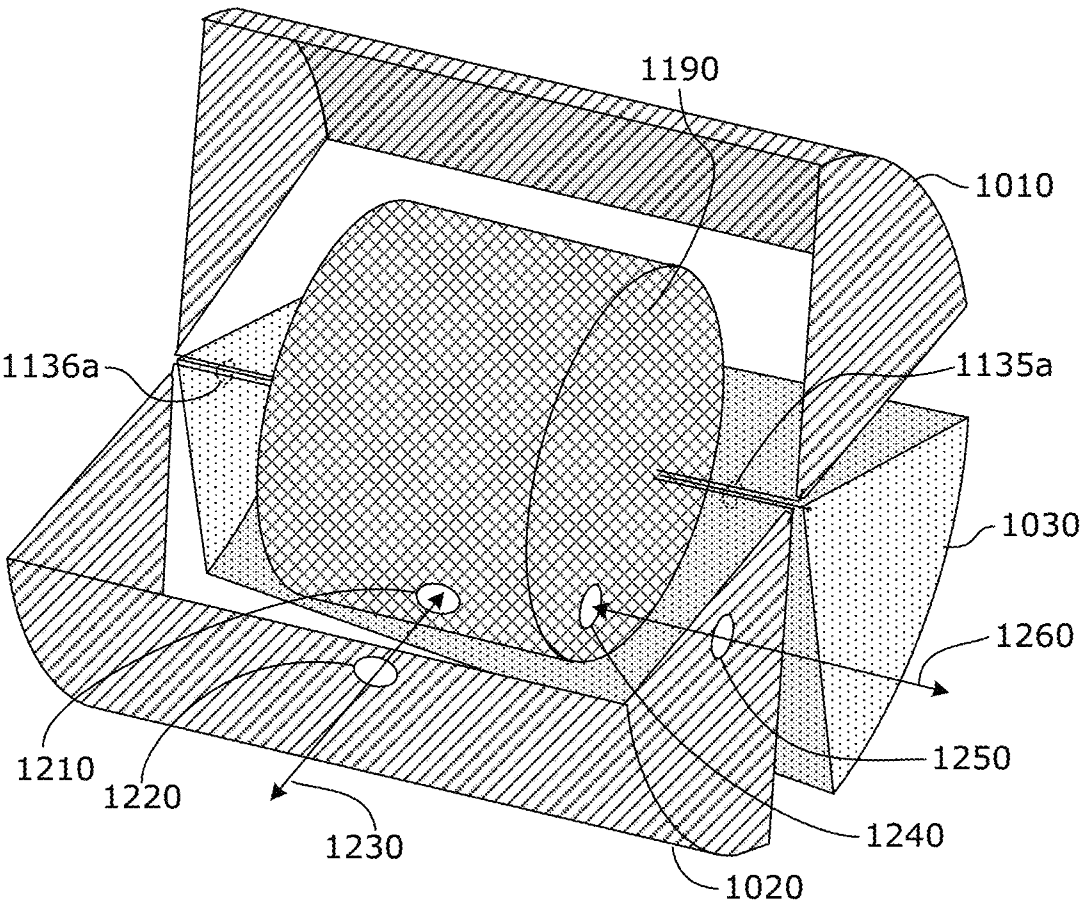
FIG. 12 is a perspective view of an embodiment of a multiport antenna according to an aspect of a disclosed embodiment.

To permit the optical components within enclosure 1190 to send and receive optical signals the enclosure 1190 and the antenna conductive sheets 1010, 1020, 1030, 1040 may be provided with one or more windows/lenses made of a transparent material, or preferably a conductive transparent material. FIG. 12 shows windows 1210 and 1240 through enclosure 1190 and shows windows 1220 and 1250 through conductive surface 1020. The window 1240 is aligned with a window 1250 permitting passage of ray 1260. The window 1210 is aligned with a window 1220 in a longitudinal portion of conductive element 1020 permitting passage of ray 1230. Rays such as 1230 and 1260 may be for an optical systems like a camera, hyperspectral sensor or other devices requiring optical input or output, or to support functions like power, data communications, and control. It will be understood here and elsewhere that as used herein the term window is intended to encompass any element made of an optically transmissive material and specifically includes lenses.

The transparent conductive material may include indium-tin-oxide. The transparent conductive material may include doped zinc oxide. The transparent conductive material may include carbon nanotubes. The transparent conductive material may comprise an amorphous material. The transparent conductive material may include a doped transparent semiconductor. The transparent conductive material may include a conductive polymer. The transparent conductive material may include a body comprising a transparent material and coating of a conductive material. The coating of a conductive material may include gold. The coating of a conductive material may include aluminum. The coating of a conductive material may include titanium. The coating of a conductive material may include chromium.

Figure 13A:
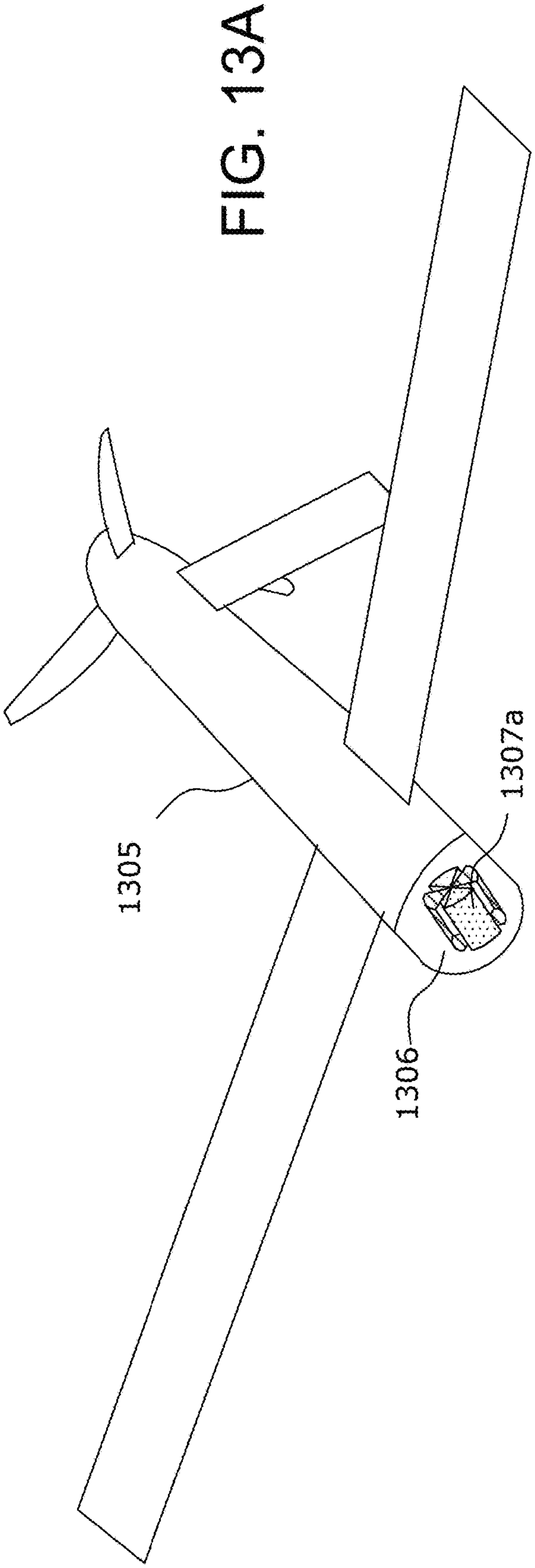
FIG. 13A is a perspective partially cutaway view of deployment of an antenna system according to an aspect of an embodiment in a UAS.

FIG. 13A shows an antenna 1307*a* of one of the configurations described above as it may be positioned within an instrumentation payload section 1306 of an unmanned aerial system 1305. The antenna 1307*a* may be dimensioned to occupy a small volume yet still provide exceptional functionality. The antenna 1307*a* may be oriented as shown or in any other manner most advantageous for the desired functionality. It can also be mounted so that its orientation is variable. As mentioned, for some implementations it may be advantageous to provide multiple antennae oriented to enhance detection capability.

Figure 13B:
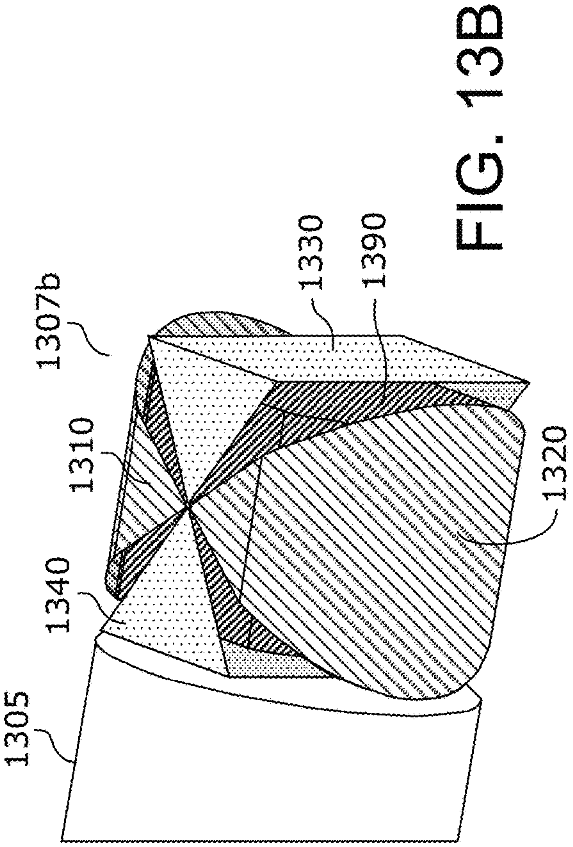
FIG. 13B is a close-up perspective partially cutaway view of deployment of a conformal antenna system according to an aspect of an embodiment in a UAS.

FIG. 13B is a close-up view of an antenna 1307*b* configured as described above and dimensioned to be conformal to a payload compartment of an unmanned aerial system 1305, increasing the antenna's gain and increasing the volume of the electronics enclosure so that it can house more electronic circuitry. Relative to the embodiments illustrated in FIGS. 10, 11 and 12, FIG. 13B illustrates how the conductive pairs 1310/1320, and 1330/1340 can be shaped differently to better fit different applications. In this case, conductive pair 1310/1320 has been made arced so as to be conformal to the outer mold line of the fuselage, while conductive pair 1330/1340 has been flattened to fit between the fuselage and the hidden nose of the aircraft. FIG. 13B also shows how the electronics enclosure 1390 can also be shaped differently to better fit different applications. In this case, the cylindrical shape has been flattened in order to simultaneously maximize its volume and provide clearance for the antenna ports.

Figure 14:
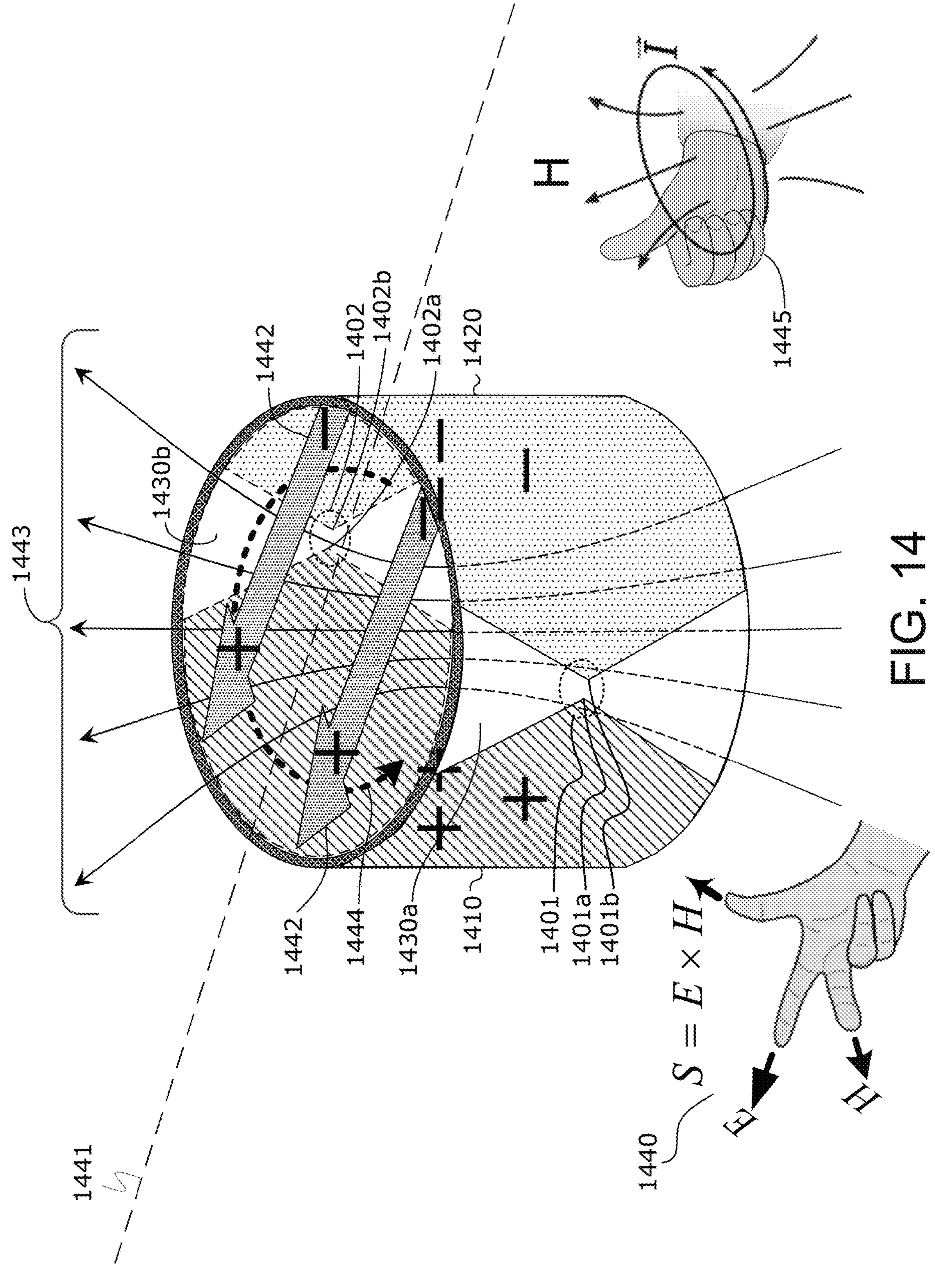
FIG. 14 is a diagram elucidating certain aspects of operation of according to an aspect of an embodiment.

FIG. 14 is a three-dimensional drawing illustrating operation of some of the principles underlying operation of some embodiments described above. Specifically, FIG. 14 illustrates how an electrically small, two-port multiport antenna simultaneously senses both an H-field and the E-field at a common physical location—the physical volume of space defined by the interior of the conductive surfaces of the multiport antenna. An incoming wave with Poynting vector S is illustrated using the right-hand rule depicted in 1440. Construction line 1441 is parallel to the E-field of the EM wave and perpendicular to its direction of propagation, S. The pair of conductive sheets 1410 and 1420 can be regarded as being like a parallel plate capacitor with capacitance between them according to the volume of space enclosed by their area and the distance between them, where the EM wave's E-field 1442 existing in that volume of space impresses a voltage across the conductors, which becomes a common voltage across first port 1401 and second port 1402. In this way, both ports sense an E-field component of the EM wave, and both ports share the same sign, which, at the time instant depicted in the figure, is positive. The incoming EM wave's H-field 1443 flows through the loop around the same volume of space. That is, the loop starting at the second terminal 1401*b* of the first port 1401, through conductive sheet 1420 to the second terminal 1402*b* of the second port 1402, through the second port to its first terminal 1402*a*, through conductive sheet 1410 to the first terminal 1401*a* of the first port, and through the first port 1401 and back to its second terminal 1401*b* to complete the loop. By virtue of the right-hand rule illustrated in 1445, the EM wave's H-field flowing through the loop induces a current 1444 to flow around the loop. This current drives the two ports 1401 and 1402 with opposite signs, which, at the time instant shown in the figure, drives the first port 1401 positive and drives the second port 1402 negative. In this way, both ports simultaneously sense both an E-field and H-field, where the two fields are sensed at the same physical location, or in other words, each port senses two EM field components at a common physical point, or at a common center point in a common volume of space. Since the fields are sensed at the same point, the antenna's output voltages can be used across wide bandwidths in a Poynting vector calculation (which is only defined at a point) to determine the EM wave's direction of travel. In the same way, the other antenna embodiments, such as shown in FIGS. 6, 7, 8, 9, 10, 11, 12, 13 also simultaneously sense, at the same physical location, multiple EM field components.

Figure 15:
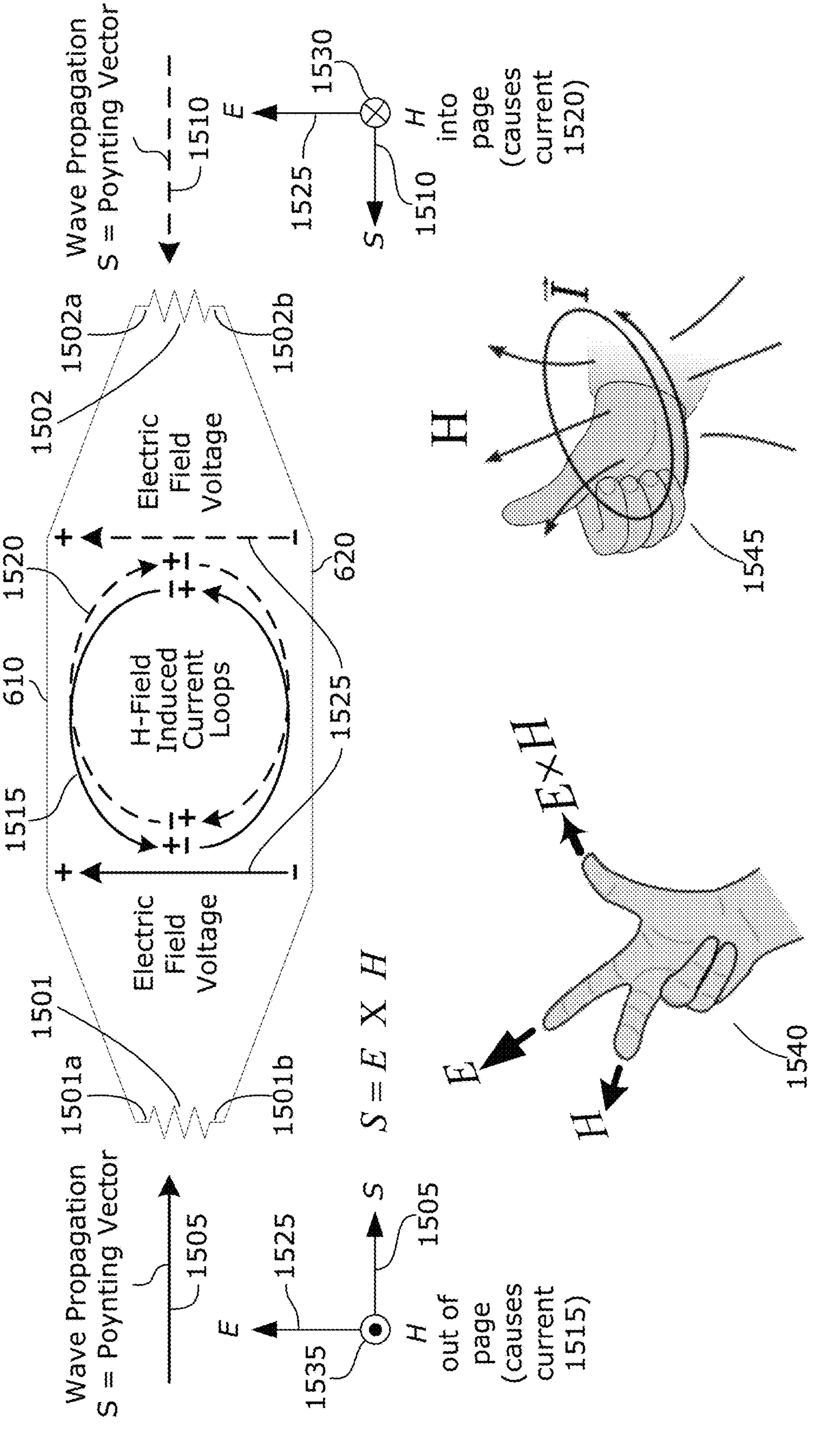
FIG. 15 is a diagram elucidating certain aspects of operation of according to an aspect of an embodiment.

FIG. 15 is a two-dimensional illustration that is similar to FIG. 14 but is a side view and instead of a cylindrical cross-section, uses the chevron cross-section of the antenna in FIG. 6. The top left of FIG. 15 shows an EM wave 1505 propagating toward the right, with an H field 1535 aimed out of the plane of the figure and an E-field 1525 pointing up, according to the right-hand rule illustrated in inset 1540. The top right of FIG. 15 shows an EM wave 1510 propagating toward the left, with an H field 1530 aimed into the plane of the figure and an E-field 1525 pointing up according to the right-hand rule illustrated in inset 1540. The upward aimed E-field in the volume of space inside the antenna is the same (i.e., upward) for both EM waves 1505 and 1510, but the H-fields from these waves are aimed in opposite directions, 1505 out of the plane of the figure and 1510 into the plane of the figure. The direction of current flow 1515 and 1520 around the loop formed by the conductive sheets 610 and 620 and the ports 1501 and 1502 follows the direction of the H-fields 1535 and 1530 respectively, according to the right-hand rule depicted in inset 1545. In the case of having a Poynting vector 1505 (a right propagating wave), (a) the voltage across the first port 1501 is positive and high since both the E-field induced voltage across the port termination and the voltage induced across the port termination caused by the H-field induced current are positive and add, while (b) the voltage across the second port 1502 is low or zero because the E-field induced voltage across the port termination is positive while the voltage induced across the port termination from the H-field induced current is negative, such that they subtract. In the opposite case of having a Poynting vector a left propagating wave 1510, by symmetry, the voltage at the first port 1501 is low while the voltage at the second port 1502 is high. This gives rise to a left pointing cardioid antenna pattern from the first port 1501 and a right pointing cardioid pattern from the second port 1502. Again, as seen in FIG. 15, both ports simultaneously sense both an E-field and H-field, where the two EM fields are sensed at the same physical location, or in other words, each port senses two EM field components at a common physical point, or at a common center point in a common volume of space between the conductive sheets, such that a Poynting vector calculation is valid across many decades of bandwidth, or in other words, a cross-product between the sensed E and H fields produce the EM wave's direction of travel regardless of its frequency. In the same way, the other antenna embodiments, such as shown in FIGS. 6, 7, 8, 9, 10, 11, 12, 13 also simultaneously sense, at the same physical location, multiple EM field components.

A wave's direction vector has three orthogonal directional components, for example, an x, y, and z component in a cartesian coordinate system. Two ports that sense one E and one H field component, such as the antenna configuration of FIG. 6, can provide only one directional component for one polarization. A mix of one E and two H field components, such as the antenna configuration of FIG. 7, can provide two directional components for a single polarization, such as an x and y component so that the azimuth can be estimated for a vertically polarized wave for example. A mix of the four field components provided by the antenna configuration of FIGS. 10, 11, and 12, such as Ex, Hy, and Ey, Hx, can provide the information required to estimate all three directional components at most combinations of incoming angle and polarization. That being the case, the single four port multiport antenna embodiments shown in FIGS. 10, 11 and 12 can support full 3D direction finding over most combinations of incoming angle and polarization in a very small package. Adding a second of the same antenna oriented to sense the missing EM field components, supports full 3D direction finding over all combinations of incoming angle and polarization in a larger, but still very small package.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The subject matter disclosed herein has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The embodiments can be further described using the following clauses:

1. A multiport antenna comprising:

a first, second, third, and fourth conductive element each having a longitudinal section, a first section at one end of the longitudinal section and disposed at a first angle to the longitudinal section and ending in a first vertex and having a first port connection and a second section at an opposite end of the longitudinal section and disposed at a second angle to the longitudinal section and ending in a second vertex and having a second port connection, the first, second, third, and fourth conductive elements being arranged sequentially to define a perimeter and an at least partially enclosed volume of the multiport antenna, the first and third conductive elements being arranged opposed to one another across a central portion of the multiport antenna and together constituting a first pair of conductive elements, the first pair of conductive elements being electrically connected to one another by a port-pair having a first port and a second port, each port having a first terminal and a second terminal, the first port connection of the first conductive element being electrically connected to the first terminal of the first port, the second port connection of the first conductive element being electrically connected to the first terminal of the second port, the first port connection of the third conductive element being electrically connected to the second terminal of the first port, and the second port connection of the third conductive element being electrically connected to the second terminal of the second port, the second and fourth conductive elements being arranged opposed to one another across the central portion of the multiport antenna and together constituting a second pair of conductive elements, the first pair of conductive elements being electrically connected to one another by a port-pair having a third port and a fourth port, each port having a first terminal and a second terminal, the first port connection of the second conductive element being electrically connected to the first terminal of the third port, the second port connection of the second conductive element being electrically connected to the first terminal of the fourth port, the first port connection of the fourth conductive element being electrically connected to the second terminal of the third port, and the second port connection of the fourth conductive element being electrically connected to the second terminal of the fourth port.

2. The multiport antenna of clause 1, wherein the first, second, third, and fourth conductive elements are arranged symmetrically around a central axis.

3. The multiport antenna of clause 1 further comprising a high-mu lining on the inside of at least one of the conductive elements.

4. The multiport antenna of clause 1 further comprising an attachment to one or more port-pairs comprised of either a balun, or a pair of differentially connected coaxial cables or the same (a) wound to form a common mode choke, or (b) surrounded with ferrite to form a common mode choke, or both, or twin-lead, or twin-lead wound to form a common-mode choke, or twisted pair, or shielded twisted pair.

5. The multiport antenna of clause 1 further comprising a balun attached to each of one or more port-pairs.

6. The multiport antenna of clause 1 further comprising a twin-lead attached to each of one or more port-pairs.

7. The multiport antenna of clause 1 further comprising a twisted-pair or shielded twisted pair attached to one or more port-pairs.

8. The multiport antenna of clause 1, wherein, for one or more pair of conductive elements, each pair having a port-pair, a (a) length between the first vertex and second vertex, (b) a width of the conductive elements, (c) a distance across the central portion between the opposing pair of conducting elements, and (d) impedances terminating the ports, are adjusted to provide directional patterns from one or more of the ports.

9. The multiport antenna of clause 1, wherein, for one or more pair of conductive elements, each pair having a port-pair, a (a) length between the first vertex and second vertex, (b) width of the conductive elements, and (c) distance across the central portion between the opposing pair of conducting elements, are adjusted to provide directional patterns from one or more of the ports when the port termination is a standard value in an inclusive range of 50 ohms to 300 ohms.

10. The multiport antenna of clause 1 wherein at least one of the first, second, third, and fourth conductive elements comprises one or more transparent windows or lenses, or conductive transparent windows or lenses.

11. The multiport antenna of clause 1, wherein the first angle is equal to the second angle.

12. The multiport antenna of clause 11, wherein the first angle is a right angle such that the first sections together define a planar shape.

13. The multiport antenna of clause 11, wherein the first angle is an oblique angle such that the first sections together define a substantially conic shape.

14. The multiport antenna of clause 1 further comprising an electrically conductive enclosure arranged within the at least partially enclosed volume of the multiport antenna.

15. The multiport antenna of clause 14 further comprising at least one electronic component arranged within the electrically conductive enclosure.

16. The multiport antenna of clause 15 wherein the at least one electronic component arranged within the electrically conductive enclosure includes an RF receiver attached to the antenna.

17. The multiport antenna of clause 14 wherein the electrically conductive enclosure comprises at least one window.

18. The multiport antenna of clause 14 wherein the electrically conductive enclosure comprises at least one electrically conductive window.

19. The multiport antenna of clause 14 wherein at least one of the first, second, third, and fourth conductive element comprises at least one first window, optically aligned with at least one second window in the electrically conductive enclosure.

20. The multiport antenna of clause 14 wherein at least one of the first, second, third, and fourth conductive element comprises at least one conductive first window, optically aligned with at least one conductive window in the electrically conductive enclosure.

21. An RF emitter characterization system comprising:

an antenna array including at least one multiport antenna with at least two ports, the antenna element comprising two or more conductive pieces with two or more ports physically distributed around the two or more conductive pieces, each port having two terminals, a first terminal and a second terminal, wherein each port's first terminal is connected to one conductive piece, and each port's second terminal is connected to a different conductive piece, and at least two of the ports form current loops through each other via their connection to the two or more conductive pieces, the two or more conductive elements being arranged around a center axis of the multiport antenna with their respective longitudinal sections together defining a circular periphery of the multiport antenna around an at least partially enclosed volume, a receiver system, and an estimator system, wherein the antenna array picks up a signal, wherein the receiver digitizes the signal picked up by the antenna array, wherein the estimator system measures or estimates various characteristics of the signal and outputs one or more of them, and wherein the characteristics that are output include one or more of the signal's angle of arrival, range, polarization, frequency, magnitude, phase, bandwidth, time of occurrence, and its JTFA characteristics.

22. An RF emitter characterization system comprised of an antenna array, a receiver system, and an estimator system, wherein the RF emitter characterization system receives configuration and filtering parameters, wherein the antenna array is comprised of at least one multiport antenna with at least two ports, the antenna element comprising two or more conductive pieces with two or more ports physically distributed around the two or more conductive pieces, each port having two terminals, a first terminal and a second terminal, wherein each port's first terminal is connected to one conductive piece, and each port's second terminal is connected to a different conductive piece, and at least two of the ports form current loops through each other via their connection to the two or more conductive pieces, the two or more conductive elements being arranged around a center axis of the multiport antenna with their respective longitudinal sections together defining a circular periphery of the multiport antenna around an at least partially enclosed volume, and outputs signals, wherein the receiver system receives the signals output by the antenna array, and outputs digitized records, wherein the estimator receives the digitized records from the receiver system, calculates digitized SoI records, uses them to compute characteristics of the SoI including an estimated AoA for the SoI, which it outputs along with other characteristics specified in the configuration and filtering parameters, and wherein the RF emitter characterization system outputs a characterization of a signal that includes characteristics specified in the configuration and filtering parameters.

23. The RF emitter characterization system of clause 22, wherein the estimator uses an array manifold.

24. The RF emitter characterization system of clause 23 wherein the array manifold is generated by combining an in-situ as installed measured array manifold and an array manifold generated via an EM simulator.

25. The RF emitter characterization system of clause 24 wherein the estimator finds a set of wavefront characteristics, for each of the one or more wavefronts received from an emitter, the set of wavefront characteristics comprising a magnitude, phase, polarization and AoA for a wavefront, wherein predicted output voltages are computed for the antenna array's ports based on the one or more sets of waveform characteristics by matching actual output voltages observed on the array's ports.

26. The RF emitter characterization system of clause 24 wherein the estimator finds a set of wavefront characteristics, for each of the one or more wavefronts received from an emitter, the set of wavefront characteristics comprising a magnitude, phase, polarization and AoA for a wavefront, wherein predicted features are computed from output voltages of the antenna array's ports predicted by the array manifold based on the one or more sets of waveform characteristics, wherein the predicted features best match the actual features computed from the actual output voltages observed on the array's ports.

27. The RF emitter characterization system of clause 24 wherein the estimator finds a set of wavefront characteristics for each of the one or more wavefronts received from an emitter, the set of wavefront characteristics comprising a magnitude, phase, polarization and AoA for a wavefront, by choosing from all combinations of one or more AoAs and one or more polarizations in the one or more sets of waveform characteristics, the combination of AoAs and polarizations that produces predicted features computed from the predicted output voltages on the antenna array's ports that best match the actual features computed from the actual output voltages observed on the array's ports.

28. The RF emitter characterization system of clause 24 wherein the estimator finds a set of wavefront characteristics for each of the one or more wavefronts received from an emitter, the set of wavefront characteristics comprising a magnitude, phase, polarization and AoA for a wavefront, by applying the observed port voltages to a computer learning algorithm that has been trained with one or both measured data and data predicted by the array manifold.

29. The RF emitter characterization system of clause 24 wherein the estimator finds a set of wavefront characteristics for each of the one or more wavefronts received from an emitter, the set of wavefront characteristics comprising a magnitude, phase, polarization and AoA for a wavefront, by applying features derived from the observed port voltages to a computer learning algorithm that has been trained with one or both measured data and data predicted by the array manifold.

30. The RF emitter characterization system of clause 29 wherein the features are the cross-correlations between either (A) the digitized SoI records observed on the various ports in the antenna array, or (B) the digitized SoI record from a reference port and the digitized SoI records observed on the other ports in the antenna array.

31. The RF emitter characterization system of clause 30 wherein the estimator finds a set of wavefront characteristics for each of the one or more wavefronts received from an emitter, the set of wavefront characteristics comprising a magnitude, phase, polarization and AoA for a wavefront, by choosing from all combinations of one or more AoAs and one or more polarizations in the one or more sets of waveform characteristics, the combination of AoAs and polarizations that produces operational features best matching predicted features computed from the predicted output voltages on the antenna array's ports, the predicted output voltages predicted by the array manifold based on the one or more sets of waveform characteristics, wherein the operational features are derived from deviated features, the deviated features being cross-correlations between either (A) digitized SoI records observed on the various ports in the antenna array, or (B) digitized SoI record from a reference port and the digitized SoI records observed on the other ports in the antenna array, and wherein at each combination of the one or more polarizations and AoAs corresponding to the one or more sets of wavefront characteristics for each of the one or more wavefronts, a deviation between the deviated features and the array manifold based predicted features is estimated, producing operational features without the estimated deviations, wherein the deviations estimated include those caused by biases in the deviated features.

32. The RF emitter characterization system of clause 30 wherein the estimator finds a set of wavefront characteristics for each of the one or more wavefronts received from an emitter, the set of wavefront characteristics comprised of a magnitude, phase, polarization and AoA for a wavefront, by applying operational features derived from observed port voltages to a computer learning algorithm that has been trained with one or both measured data and data predicted by the array manifold derived via computer EM simulation, wherein the features are derived from deviated features, the deviated features being either (A) the digitized SoI records observed on the various ports in the antenna array, or (B) the digitized SoI record from a reference port and the digitized SoI records observed on the other ports in the antenna array, and wherein at each combination of the one or more polarizations and angles of arrival, the deviation between the deviated features and the array manifold based features is estimated, including deviations caused by biases in the deviated features, producing, features without the estimated deviations.

33. The RF emitter characterization system of clause 30 further comprising a clustering system adapted to refine the computed characteristics of the SoI including an estimated AoA based at least in part on more than one estimation of the SoI's characteristics prior to outputting a characterization of a signal that includes an angle of arrival of the signal and other characteristics of the signal as specified in configuration and filtering parameters.

34. A multiport antenna comprising:

four conductive elements each having a longitudinal section, a first section at one end of the longitudinal section and disposed at an angle to the longitudinal section and ending in a first vertex having a first port connection and a second section at an opposite end of the longitudinal section and disposed at the angle to the longitudinal section and ending in a second vertex having a second port connection, the four conductive elements being arranged around a center axis of the multiport antenna with their respective longitudinal sections together defining a circular periphery of the multiport antenna with an at least partially enclosed volume, the four conductive elements thus being arranged in a first and second pair of opposed conductive elements, the first pair of conductive elements being electrically connected to one another by a first pair of ports and the second pair of conductive elements being electrically connected to one another by a second pair of ports.

35. A multiport antenna having a multiport antenna element with at least two ports, the antenna element comprising two or more conductive pieces with two or more ports physically distributed around the two or more conductive pieces, each port having two terminals, a first terminal and a second terminal, wherein each port's first terminal is connected to one conductive piece, and each port's second terminal is connected to a different conductive piece, and at least two of the ports form current loops through each other via their connection to the two or more conductive pieces, the two or more conductive elements being arranged around a center axis of the multiport antenna with their respective longitudinal sections together defining a circular periphery of the multiport antenna around an at least partially enclosed volume.

36. The multiport antenna of clause 35 wherein each current loop has an axis, the axis being perpendicular to the plane centered on the loop and containing the at least two ports.

37. The multiport antenna of clause 35 wherein the current loops are H-field sensing current loops having a current flowing through the same shared conductive pieces and across the same shared terminals of the same set of physically distributed ports, that are sensing E-fields, the E-fields inducing a voltage across those same ports.

38. The multiport antenna of clause 35 further comprising a second multiport antenna element with at least two second multiport antenna element ports, the second multiport antenna element antenna element comprising two or more second multiport antenna element conductive pieces with two or more second multiport antenna element ports physically distributed around the two or more second multiport antenna element conductive pieces, each second multiport antenna element port having two terminals, a first terminal and a second terminal, wherein each port's first terminal is connected to one second multiport antenna element conductive piece, and each port's second terminal is connected to a different second multiport antenna element conductive piece, and at least two of the ports form second multiport antenna element current loops through each other via their connection to the two or more conductive pieces, the second multiport antenna element being oriented to be capable of sensing EM field components not sensed by the multiport antenna element to permit unambiguous direction finding on any polarization wave from any angle.

39. A multiport antenna comprising a first multiport antenna element and a second multiport antenna element, wherein each of the first multiport antenna element and a second multiport antenna element senses two E-field components and two H field components, the first multiport antenna element and the second multiport antenna element being arranged to define an at least partially enclosed volume.

40. The multiport antenna of clause 39 wherein the second multiport antenna element is oriented to sense EM field components not sensed by the multiport antenna element to permit unambiguous direction finding on any polarization wave from any angle.

41. The multiport antenna of clause 39 wherein the multiport antenna is dimensioned and configured to fit within a payload compartment of an unmanned aerial vehicle.

What is claimed is:

1. A multiport antenna comprising:

a first, second, third, and fourth conductive element each having a longitudinal section, a first section at one end of the longitudinal section and disposed at a first angle to the longitudinal section and ending in a first vertex and having a first port connection and a second section at an opposite end of the longitudinal section and disposed at a second angle to the longitudinal section and ending in a second vertex and having a second port connection, the first, second, third, and fourth conductive elements being arranged sequentially to define a perimeter and an at least partially enclosed volume of the multiport antenna, the first and third conductive elements being arranged opposed to one another across a central portion of the multiport antenna and together constituting a first pair of conductive elements, the first pair of conductive elements being electrically connected to one another by a port-pair having a first port and a second port, each port having a first terminal and a second terminal, the first port connection of the first conductive element being electrically connected to the first terminal of the first port, the second port connection of the first conductive element being electrically connected to the first terminal of the second port, the first port connection of the third conductive element being electrically connected to the second terminal of the first port, and the second port connection of the third conductive element being electrically connected to the second terminal of the second port, the second and fourth conductive elements being arranged opposed to one another across the central portion of the multiport antenna and together constituting a second pair of conductive elements, the first pair of conductive elements being electrically connected to one another by a port-pair having a third port and a fourth port, each port having a first terminal and a second terminal, the first port connection of the second conductive element being electrically connected to the first terminal of the third port, the second port connection of the second conductive element being electrically connected to the first terminal of the fourth port, the first port connection of the fourth conductive element being electrically connected to the second terminal of the third port, and the second port connection of the fourth conductive element being electrically connected to the second terminal of the fourth port.

2. The multiport antenna of claim 1, wherein the first, second, third, and fourth conductive elements are arranged symmetrically around a central axis.

3. The multiport antenna of claim 1 further comprising a high-mu lining on the inside of at least one of the conductive elements.

4. The multiport antenna of claim 1 further comprising an attachment to one or more port-pairs comprised of either a balun, or a pair of differentially connected coaxial cables or the same (a) wound to form a common mode choke, or (b) surrounded with ferrite to form a common mode choke, or both, or twin-lead, or twin-lead wound to form a common-mode choke, or twisted pair, or shielded twisted pair.

5. The multiport antenna of claim 1 further comprising a balun attached to each of one or more port-pairs.

6. The multiport antenna of claim 1 further comprising a twin-lead attached to each of one or more port-pairs.

7. The multiport antenna of claim 1 further comprising a twisted-pair or shielded twisted pair attached to one or more port-pairs.

8. The multiport antenna of claim 1, wherein, for one or more pair of conductive elements, each pair having a port-pair, a (a) length between the first vertex and second vertex, (b) a width of the conductive elements, (c) a distance across the central portion between the opposing pair of conducting elements, and (d) impedances terminating the ports, are adjusted to provide directional patterns from one or more of the ports.

9. The multiport antenna of claim 1, wherein, for one or more pair of conductive elements, each pair having a port-pair, a (a) length between the first vertex and second vertex, (b) width of the conductive elements, and (c) distance across the central portion between the opposing pair of conducting elements, are adjusted to provide directional patterns from one or more of the ports when the port termination is a standard value in an inclusive range of 50 ohms to 300 ohms.

10. The multiport antenna of claim 1 wherein at least one of the first, second, third, and fourth conductive elements comprises one or more transparent windows or lenses, or conductive transparent windows or lenses.

11. The multiport antenna of claim 1, wherein the first angle is equal to the second angle.

12. The multiport antenna of claim 11, wherein the first angle is a right angle such that the first sections together define a planar shape.

13. The multiport antenna of claim 11, wherein the first angle is an oblique angle such that the first sections together define a substantially conic shape.

14. The multiport antenna of claim 1 further comprising an electrically conductive enclosure arranged within the at least partially enclosed volume of the multiport antenna.

15. The multiport antenna of claim 14 further comprising at least one electronic component arranged within the electrically conductive enclosure.

16. The multiport antenna of claim 15 wherein the at least one electronic component arranged within the electrically conductive enclosure includes an RF receiver attached to the antenna.

17. The multiport antenna of claim 14 wherein the electrically conductive enclosure comprises at least one window.

18. The multiport antenna of claim 14 wherein the electrically conductive enclosure comprises at least one electrically conductive window.

19. The multiport antenna of claim 14 wherein at least one of the first, second, third, and fourth conductive element comprises at least one first window, optically aligned with at least one second window in the electrically conductive enclosure.

20. The multiport antenna of claim 14 wherein at least one of the first, second, third, and fourth conductive element comprises at least one conductive first window, optically aligned with at least one conductive window in the electrically conductive enclosure.

21. A multiport antenna comprising:

four conductive elements each having a longitudinal section, a first section at one end of the longitudinal section and disposed at an angle to the longitudinal section and ending in a first vertex having a first port connection and a second section at an opposite end of the longitudinal section and disposed at the angle to the longitudinal section and ending in a second vertex having a second port connection, the four conductive elements being arranged around a center axis of the multiport antenna with their respective longitudinal sections together defining a circular periphery of the multiport antenna with an at least partially enclosed volume, the four conductive elements thus being arranged in a first and second pair of opposed conductive elements, the first pair of conductive elements being electrically connected to one another by a first pair of ports and the second pair of conductive elements being electrically connected to one another by a second pair of ports.

* * * * *